(12) United States Patent
Bex et al.

(10) Patent No.: US 10,112,584 B2
(45) Date of Patent: Oct. 30, 2018

(54) WIPING DEVICE, IN PARTICULAR WIPING DEVICE FOR A MOTOR VEHICLE PANE

(71) Applicant: Robert Bosch GmbH, Stuttgart (DE)

(72) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/670,669

(22) Filed: Aug. 7, 2017

(65) Prior Publication Data

US 2017/0334402 A1 Nov. 23, 2017

Related U.S. Application Data

(63) Continuation of application No. 14/130,290, filed as application No. PCT/EP2012/059357 on May 21, 2012, now Pat. No. 9,758,132.

(30) Foreign Application Priority Data

Jun. 28, 2011 (DE) .................. 10 2011 078 197

(51) Int. Cl.
*B60S 1/38* (2006.01)
*B29C 47/00* (2006.01)

(52) U.S. Cl.
CPC .......... *B60S 1/3881* (2013.01); *B29C 47/003* (2013.01); *B29C 47/0004* (2013.01); *B60S 1/381* (2013.01); *B60S 1/3848* (2013.01); *B60S 1/3882* (2013.01)

(58) Field of Classification Search
CPC ...... B60S 1/3806; B60S 1/381; B60S 1/3881; B60S 1/3848; B60S 1/3882

USPC ....................... 15/250.201, 250.43
See application file for complete search history.

(56) References Cited

U.S. PATENT DOCUMENTS

| | | | |
|---|---|---|---|
| 7,228,588 B2 | 6/2007 | Kraemer et al. | |
| 7,370,385 B2 | 5/2008 | Chiang | |
| 2006/0156529 A1 | 7/2006 | Thomar et al. | |
| 2007/0174989 A1 | 8/2007 | Moll et al. | |
| 2009/0089956 A1 | 4/2009 | De Block et al. | |
| 2010/0064468 A1 | 3/2010 | Kang | |
| 2010/0218333 A1 | 9/2010 | Ritt | |
| 2010/0242204 A1 | 9/2010 | Chien | |
| 2012/0030894 A1 | 2/2012 | Garrastacho et al. | |

FOREIGN PATENT DOCUMENTS

| | | |
|---|---|---|
| CN | 2936852 Y | 8/2007 |
| CN | 101213121 | 7/2008 |
| CN | 101618710 A | 1/2010 |
| CN | 101626925 | 1/2010 |
| DE | 102005062462 | 6/2007 |
| DE | 102006020524 | 11/2007 |
| DE | 102007045253 | 4/2009 |

(Continued)

OTHER PUBLICATIONS

International Search Report for Application No. PCT/EP2012/059357 dated Aug. 24, 2013 (English Translation, 3 pages).

*Primary Examiner* — Gary Graham
(74) *Attorney, Agent, or Firm* — Michael Best & Friedrich LLP

(57) ABSTRACT

The invention relates to a wiping device, in particular a wiping device for a motor vehicle pane, comprising a spoiler unit (22*a*-22*p*). According to the invention, said spoiler unit (22*a*-22*p*) is produced in a co-extrusion process.

11 Claims, 16 Drawing Sheets

(56) References Cited

FOREIGN PATENT DOCUMENTS

| EP | 2042394 | 4/2009 |
|---|---|---|
| EP | 2415645 | 2/2012 |
| FR | 2923785 | 5/2009 |
| FR | 2928887 | 9/2009 |
| WO | 2012089409 | 7/2012 |

# WIPING DEVICE, IN PARTICULAR WIPING DEVICE FOR A MOTOR VEHICLE PANE

BACKGROUND OF THE INVENTION

A wiping device, in particular a wiping device for a motor vehicle pane, with a spoiler unit, is already known.

SUMMARY OF THE INVENTION

The invention is based on a wiping device, in particular a wiping device for a motor vehicle pane, with a spoiler unit.

It is proposed that the spoiler unit is produced in a co-extrusion process whereby the spoiler unit can be produced in a particularly stable manner and at the same time economically. The term "spoiler unit" in this context in particular means a unit which is provided to deflect travel wind acting on the wiping device and/or to use this to press a wiper blade onto a vehicle pane. A "co-extrusion process" in this context in particular means the merging of at least two plastic melts of different types before they leave a profile nozzle. A "wiper blade" in this context in particular is a strip which is provided to wipe a vehicle pane. Preferably the wiper blade is made of a rubber material. The term "provided" in particular should be understood as specially designed and/or equipped. Preferably the spoiler unit has at least one concave outer face.

Furthermore it is proposed that the spoiler unit has two spoiler part elements of different hardness, whereby advantageously weight can be reduced and strength increased.

Furthermore it is proposed that the harder spoiler part element terminates the spoiler unit laterally, whereby the softer spoiler part element can advantageously be protected from damage. The term "laterally" in this context is understood in particular as when viewed in the wiping direction. "Terminate" in this context in particular means cover, surround and/or conceal.

In a further embodiment of the invention, it is proposed that the softer spoiler part element has a longitudinal channel with a triangular cross section, whereby advantageously material and weight can be saved. "Triangular" in this context means a contour with three corners. The corners can also be rounded, depending on application.

If the softer spoiler part element and the harder spoiler part element are joined together by material fit over a wide area in a plane running parallel to a wiping direction, a particularly stable connection of the spoiler part elements can be achieved. The term "wiping direction" in this context in particular means the direction which extends parallel to a surface to be wiped and/or vertically to the main orientation of the wiper blade. The phrase "over a wide area" in this context in particular means over a majority of a joining area. A "majority" in this context is in particular more than 50%, preferably more than 80%.

Furthermore it is proposed that the wiping device comprises a holding unit which has a holding element with a longitudinal guidance channel to guide a spring element, wherein the holding element has at least one fixing element which is provided to couple the spoiler unit by form fit in mounted state, whereby a particularly secure mounting of the spoiler unit can be achieved. A "holding unit" in this context means in particular a unit which is provided to connect the spoiler unit with a wiper blade. A "holding element" in this context in particular means an element which is provided to connect a spoiler unit, a spring element and a wiper blade by form fit. A "fixing element" in this context is in particular an element which is provided to create a form fit with a corresponding component. A "longitudinal guidance channel" in this context in particular is a guidance channel which extends parallel to a longitudinal direction of the holding unit. Preferably the longitudinal guidance channel comprises a cavity and at least one channel wall adjacent to the cavity. A "longitudinal direction" in this context is in particular a direction which extends substantially parallel to a longitudinal extension of the holding element. A "longitudinal extension" in this context in particular means as large as possible an extension. "Substantially" in this context in particular means a deviation of less than 10°, preferably less than 5°. An "extension" of an element in this context in particular is a maximum distance between two points of a vertical projection of the element on a plane. A "spring element" in this context in particular is a spring-elastic element which has at least one extension which in normal operating state can be varied elastically by at least 10%, in particular by at least 20%, preferably by at least 30% and particularly advantageously by at least 50%, and which in particular generates a counter-force depending on the change in extension and preferably proportional to the change, which counters the change. "Coupling" in this context means connecting and/or joining.

In a main contact flow region of the wiping device, joints and hence flow resistances and/or noise can be avoided if the spoiler unit lies at least partly laterally on the holding element in the region of the longitudinal guidance channel. "Laterally" in this context in particular means viewed from the wiping direction.

Furthermore it is proposed that the holding element has at least one fixing means which with a free end faces the longitudinal guidance channel and is provided to create a form fit with the spoiler unit, whereby the wiping device can be formed in a particularly stable manner.

BRIEF DESCRIPTION OF THE DRAWINGS

Further advantages arise from the description of the drawings below. The drawings show 16 exemplary embodiments of the invention. The drawings, description and claims contain numerous features in combination. The person skilled in the art shall where applicable also consider the features individually and combine these into further sensible combinations.

The drawings show.

DETAILED DESCRIPTION

Figure 1:
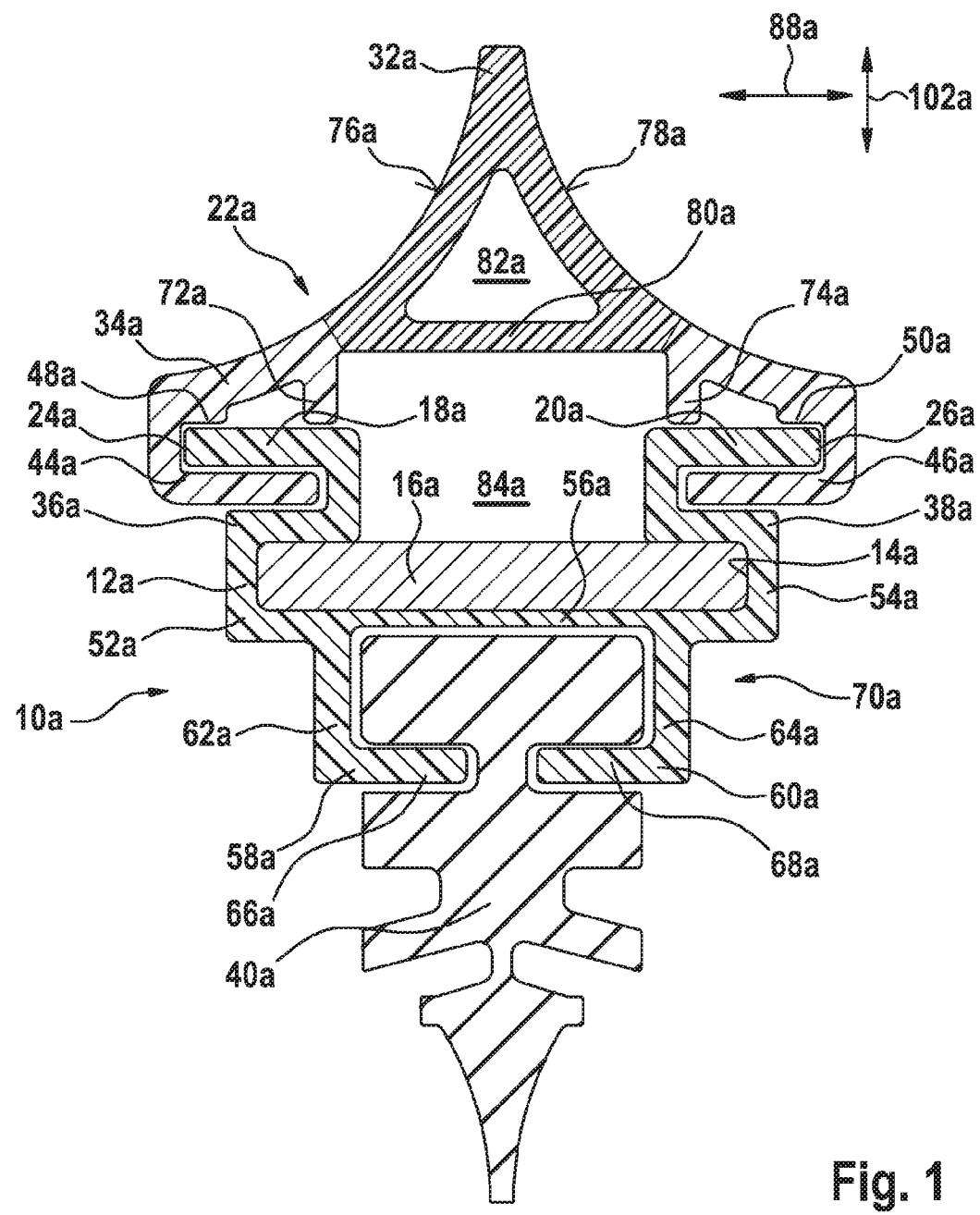
FIG. 1 a cross section view of a wiping device with a holding unit.

FIG. 1 shows a cross section view of a wiping device according to the invention with a holding unit 10a with a holding element 12a having a longitudinal guidance channel 14a to guide a spring element 16a. The section plane runs perpendicular to a longitudinal direction of the holding element 12a.

The holding element 12a has two fixing elements 18a, 20a. The fixing elements 18a, 20a are formed integrally with the holding element 12a. At their free ends 24a, 26a, the fixing elements 18a, 20a point in directions away from each other, parallel to a wiping direction 88a. Furthermore the fixing elements 18a, 20a extend in an L-shape from channel walls 36a, 38a which delimit the longitudinal guidance channel 14a. A distance between the free ends 24a, 26a is greater than a width of the longitudinal guidance channel 14a. The fixing elements 18a, 20a are provided to couple a spoiler unit 22a by form fit in a mounted state. For this the free ends 24a, 26a of the fixing elements 18a, 20a are surrounded by the spoiler unit 22a. The spoiler unit 22a has two L-shaped fixing means 44a, 46a and support bodies 48a, 50a adjacent to the fixing means 44a, 46a.

To guide the spring element 16a, side walls 52a, 54a of the longitudinal guidance channel 14a border the channel walls 36a, 38a. The channel walls 36a, 38a here enclose a right angle with the side walls 52a, 54a. Furthermore an intermediate wall 56a is arranged on the side walls 52a, 54a which terminates the longitudinal guidance channel 14a in the direction of a wiper blade 40a. The side walls 52a, 54a extend from the intermediate wall 56a in a direction away from the wiper blade 40a. The holding element 12a has a longitudinal opening 84a which opens the longitudinal guidance channel 14a towards the spoiler unit 22a.

Two L-shaped guide profiles 58a, 60a of the holding unit 10a are arranged on the intermediate wall 56a. The guide profiles 58a, 60a are formed integrally with the holding element 12a. The guide profiles 58a, 60a each have a side guide 62a, 64a and a vertical guide 66a, 68a. The vertical guides 66a, 68a enclose an angle of 90° with the respective side guides 62a, 64a. The vertical guides 66a, 68a point towards each other. The side guides 62a, 64a each enclose an angle of 90° to the intermediate wall 56a. The guide profiles 58a, 60a point in directions towards each other at their free ends of the vertical guides 66a, 68a. The guide profiles 58a, 60a and the intermediate wall 56a form a piping rail 70a in which the wiper blade 40a is introduced.

The holding element 12a is produced integrally from polyethylene in an extrusion process. A person skilled in the art in this context will consider various plastics which appear suitable such as in particular polypropylene, polyamide, polyvinyl chloride and/or polystyrene.

The spoiler unit 22a is produced in a co-extrusion process from two spoiler part elements 32a, 34a of different hardness. The first spoiler part element 32a has two spoiler sides 76a, 78a which are formed concave towards the outside. To reinforce the spoiler unit 22a, the first spoiler part element 32a has a connecting web 80a which joins together the concave spoiler sides 76a, 78a. The connecting web 80a and the spoiler sides 76a, 78a surround a longitudinal channel 82a with a triangular cross section.

The first spoiler part element 32a is formed integrally with the second spoiler part element 34a and is provided to deflect travel wind. The second spoiler part element 34a has a greater strength and hardness than the first spoiler part element 32a. The L-shaped fixing means 44a, 46a and the support bodies 48a, 50a adjacent to the fixing means 44a, 46a are molded onto the second spoiler part element 34a. The harder spoiler part element 34a surrounds the fixing elements 18a, 20a and thus terminates the holding unit 10a laterally.

Furthermore the second spoiler part element 34a has two support webs 72a, 74a. The support webs 72a, 74a lie with their free ends on the fixing elements 18a, 20a on a side facing away from the wiper blade 40a. The support webs 72a, 74a are provided for transmitting contact forces which occur at the spoiler unit 22a when exposed to travel wind. The support webs 72a, 74a extend over the entire length of the spoiler unit 22a.

The spring element 16a is let into the longitudinal guidance channel 14a. The spring element 16a is made from spring steel and is provided to form the holding unit 10a in an elastically deflectable manner.

For assembly, first the spring element 16a is introduced into the longitudinal guidance channel 14a. Then the wiper blade 40a is pushed into the piping rail 70a and creates a form fit with the holding element 12a. The spoiler unit 22a is now pushed over the fixing elements 18a, 20a and is then connected therewith by form fit.

FIGS. 2 to 16 describe 15 further exemplary embodiments of the invention. The descriptions below are substantially restricted to the differences between the exemplary embodiments, wherein with regard to components, features and functions which remain the same, reference can be made to the description of the first exemplary embodiment. To distinguish the exemplary embodiments, the letter a in the reference numerals of the exemplary embodiment in FIG. 1 is replaced by the letters b to p in the reference numerals of the exemplary embodiments in FIGS. 2 to 16. With regard to components of the same designation, in particular components with the same reference numerals, in principle reference can also be made to the drawings and/or the description of the first exemplary embodiment.

Figure 2:
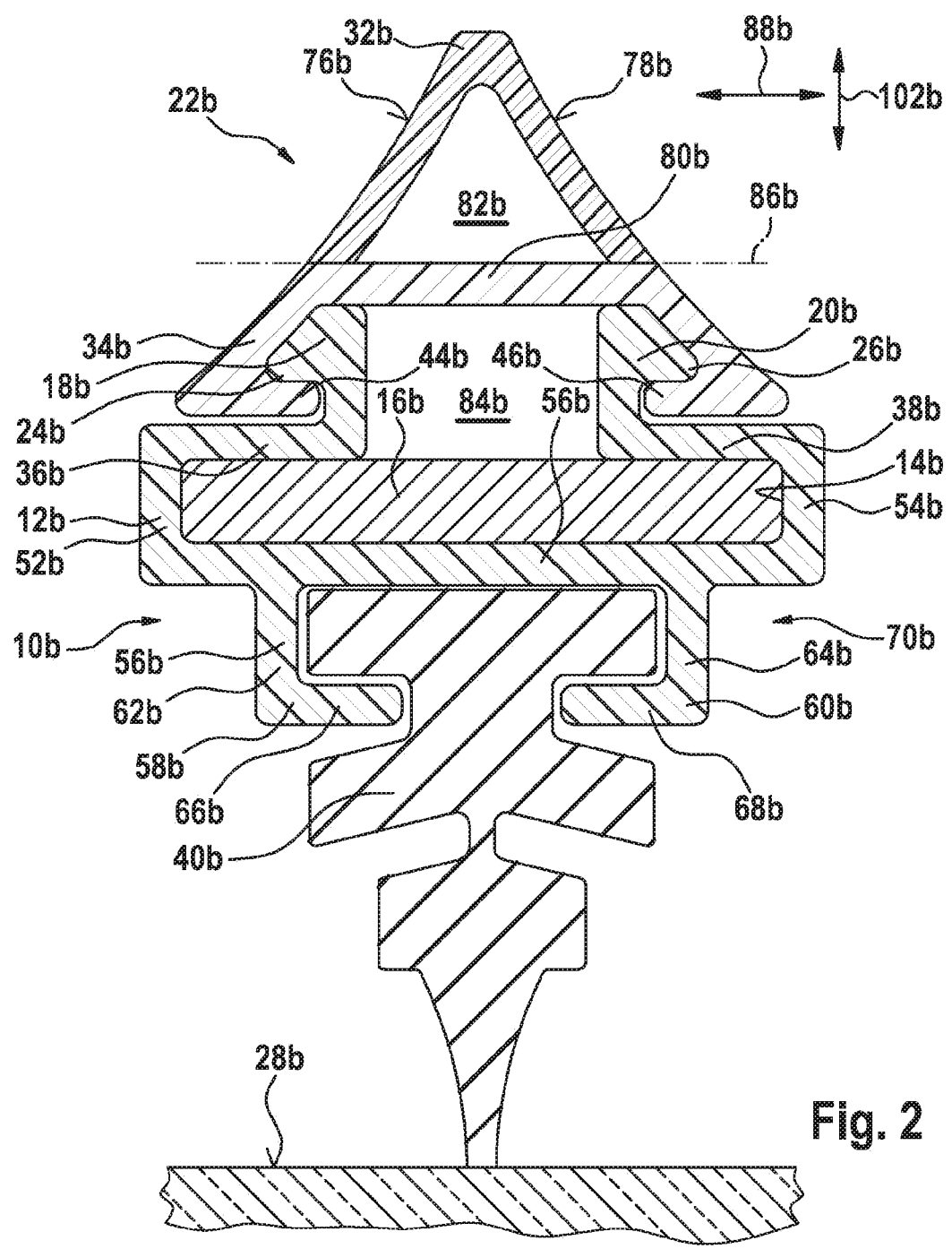
FIG. 2 a cross section view of a further exemplary embodiment of a wiping device with a holding unit.

FIG. 2 shows a cross section view of a further exemplary embodiment of a wiping device according to the invention with a holding unit 10b with a holding element 12b having a longitudinal guidance channel 14b to guide a spring element 16b. The section plane runs perpendicular to a longitudinal direction of the holding element 12b.

The holding element 12b has two fixing elements 18b, 20b. The fixing elements 18b, 20b are formed integrally with the holding element 12b. At their free ends 24b, 26b, the fixing elements 18b, 20b point in directions away from each other. Furthermore the fixing elements 18b, 20b form two channel walls 36b, 38b which border the longitudinal guidance channel 14b on a side facing away from the wiper blade. In the region of their free ends 24b, 26b, the fixing elements 18b, 20b are formed as barbs. The ends 24b, 26b are surrounded by a spoiler unit 22b. For this, the spoiler unit 22b has two fixing means 44b, 46b.

To guide the spring element 16b, side walls 52b, 54b of the longitudinal guidance channel 14b border the channel walls 36b, 38b. The channel walls 36b, 38b here enclose a right angle with the side walls 52b, 54b. Furthermore an intermediate wall 56b is arranged on the side walls 52b, 54b which terminates the longitudinal guidance channel 14b in the direction of a wiper blade 40b. The side walls 52b, 54b extend from the intermediate wall 56b in a direction away from the wiper blade 40b. The holding element 12b has a longitudinal opening 84b which opens the longitudinal guidance channel 14b towards the spoiler unit 22b.

Two L-shaped guide profiles 58b, 60b of the holding unit 10b are arranged on the intermediate wall 56b. The guide profiles 58b, 60b are formed integrally with the holding element 12b. The guide profiles 58b, 60b each have a side guide 62b, 64b and a vertical guide 66b, 68b. The vertical guides 66b, 68b enclose an angle of 90° with the respective side guides 62b, 64b. The vertical guides 66b, 68b point towards each other. The side guides 62b, 64b each enclose an angle of 90° to the intermediate wall 56b. The guide profiles 58b, 60b point in directions towards each other at their free ends of the vertical guides 66b, 68b. The guide profiles 58b, 60b and the intermediate wall 56b form a piping rail 70b in which the wiper blade 40b is introduced.

The holding element 12b is produced integrally from polyethylene in an extrusion process. A person skilled in the art in this context will consider various plastics which appear suitable such as in particular polypropylene, polyamide, polyvinyl chloride and/or polystyrene.

The spoiler unit 22b is produced in a co-extrusion process from two spoiler part elements 32b, 34b of different hardness. The first spoiler part element 32b has two spoiler sides 76b, 78b which are formed concave towards the outside.

The softer spoiler part element 32b and the harder spoiler part element 34b are joined together by material fit over a wide area in a plane 86b running parallel to a wiping direction 88b. The plane 86b extends parallel to a surface 28b to be wiped by the wiper blade 40b. To reinforce the spoiler unit 22b, the second spoiler part element 34b has a connecting web 80b which joins together the concave spoiler sides 76b, 78b. The connecting web 80b and the spoiler sides 76b, 78b are joined together by material fit and surround a longitudinal channel 82b which has a rectangular cross section.

The first spoiler part element 32b is formed integrally with the second spoiler part element 34b and is provided to deflect travel wind. The second spoiler part element 34b has a greater strength and hardness than the first spoiler part element 32b. The fixing means 44b, 46b are molded onto the second spoiler part element 34b. The fixing means 44b, 46b are formed with an acute angle and lie by form fit on the fixing elements 18b, 20b. The harder spoiler part element 34b surrounds the fixing elements 18b, 20b and thus terminates the holding unit 10b laterally. The spring element 16b is let into the longitudinal guidance channel 14b. The spring element 16b is made from spring steel and is provided to form the holding unit 10b in an elastically deflectable manner.

For assembly, first the spring element 16b is introduced into the longitudinal guidance channel 14b. Then the wiper blade 40b is pushed into the piping rail 70b and creates a form fit with the holding element 12b. The spoiler unit 22b is now pushed over the fixing elements 18b, 20b and is then connected therewith by form fit.

Figure 3:
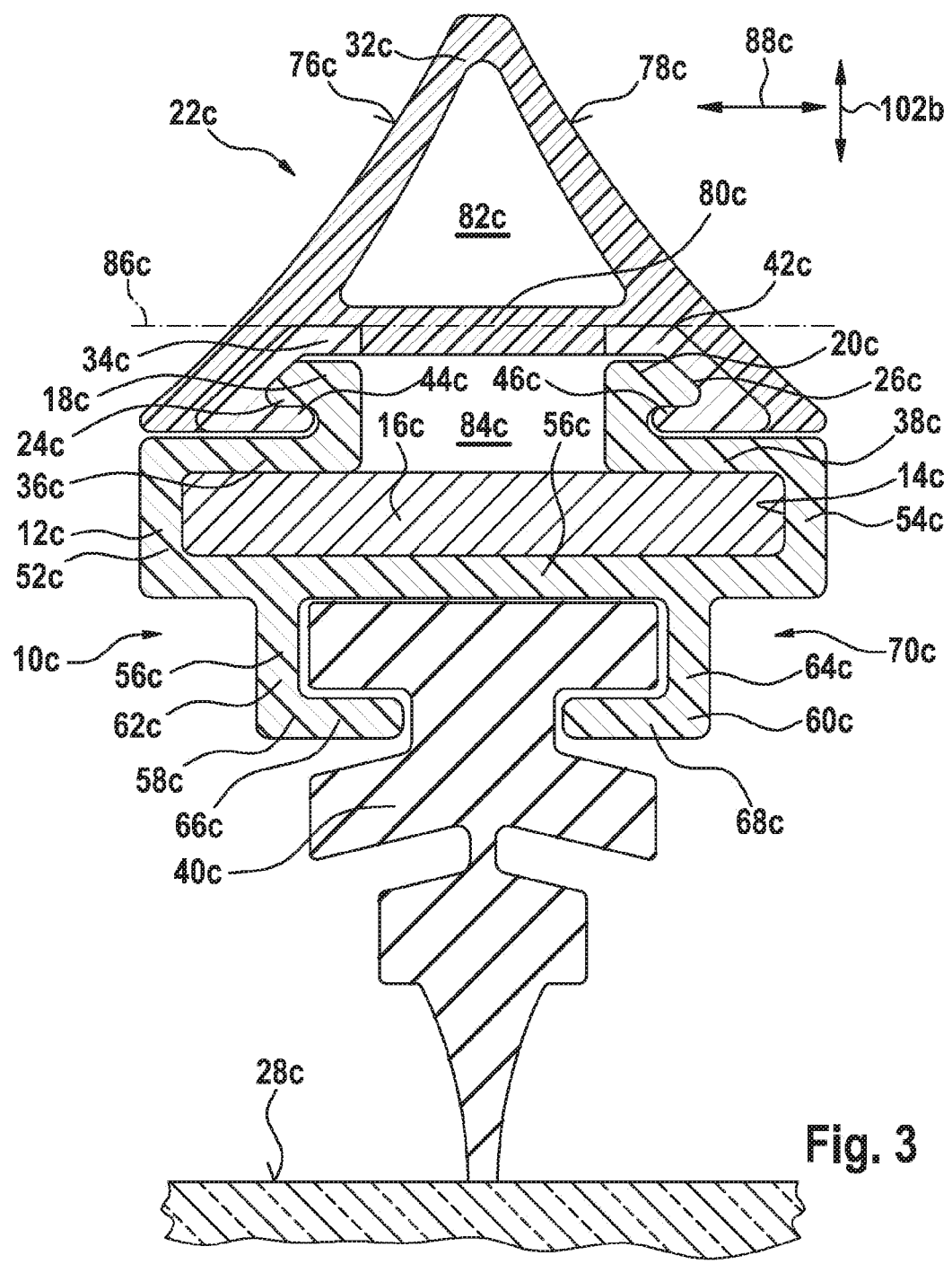
FIG. 3 a cross section view of a further exemplary embodiment of a wiping device with a holding unit.

FIG. 3 shows a cross section view of a further exemplary embodiment of a wiping device according to the invention with a holding unit 10c with a holding element 12c having a longitudinal guidance channel 14c to guide a spring element 16c. The section plane runs perpendicular to a longitudinal direction of the holding element 12c.

The holding element 12c has two fixing elements 18c, 20c. The fixing elements 18c, 20c are formed integrally with the holding element 12c. At their free ends 24c, 26c, the fixing elements 18c, 20c point in directions away from each other. Furthermore the fixing elements 18c, 20c form two channel walls 36c, 38c which border the longitudinal guidance channel 14c on a side facing away from the wiper blade. In the region of their free ends 24c, 26c, the fixing elements 18c, 20c are formed as barbs. The ends 24c, 26c are surrounded by a spoiler unit 22c. For this, the spoiler unit 22c has two fixing means 44c, 46c.

To guide the spring element 16c, side walls 52c, 54c of the longitudinal guidance channel 14c border the channel walls 36c, 38c. The channel walls 36c, 38c here enclose a right angle with the side walls 52c, 54c. Furthermore an intermediate wall 56c is arranged on the side walls 52c, 54c which terminates the longitudinal guidance channel 14c in the direction of a wiper blade 40c. The side walls 52c, 54c extend from the intermediate wall 56c in a direction away from the wiper blade 40c. The holding element 12c has a longitudinal opening 84c which opens the longitudinal guidance channel 14c towards the spoiler unit 22c.

Two L-shaped guide profiles 58c, 60c of the holding unit 10c are arranged on the intermediate wall 56c. The guide profiles 58c, 60c are formed integrally with the holding element 12c. The guide profiles 58c, 60c each have a side guide 62c, 64c and a vertical guide 66c, 68c. The vertical guides 66c, 68c enclose an angle of 90° with the respective side guides 62c, 64c. The vertical guides 66c, 68c point towards each other. The side guides 62c, 64c each enclose an angle of 90° to the intermediate wall 56c. The guide profiles 58c, 60c point in directions towards each other at their free ends of the vertical guides 66c, 68c. The guide profiles 58c, 60c and the intermediate wall 56c form a piping rail 70c in which the wiper blade 40c is introduced.

The holding element 12c is produced integrally from polyethylene in an extrusion process. A person skilled in the art in this context will consider various plastics which appear suitable such as in particular polypropylene, polyamide, polyvinyl chloride and/or polystyrene.

The spoiler unit 22c is produced in a co-extrusion process from two spoiler part elements 32c, 34c, 42c of different hardness. The first spoiler part element 32c has two spoiler sides 76c, 78c which are formed concave towards the outside. The softer spoiler part element 32c and the harder spoiler part elements 34c, 42c are joined together by material fit over a wide area in a plane 86c running parallel to a wiping direction 88c. The plane 86c extends parallel to a surface 28c to be wiped by the wiper blade 40c. To reinforce the spoiler unit 22c, the first spoiler part element 32c has a connecting web 80c which joins together the concave spoiler sides 76c, 78c. The connecting web 80c and the spoiler sides 76c, 78c are joined together by material fit and surround a longitudinal channel 82c with a triangular cross section.

The first spoiler part element 32c is formed integrally with the spoiler part elements 34c, 42c and is provided to deflect travel wind. The spoiler part elements 34c, 42c have a greater strength and hardness than the first spoiler part element 32c. The spoiler part elements 34c, 42c are formed separately from each other. The spoiler part element 34c forms the fixing means 44c. The spoiler part element 42c forms the fixing means 46c. The fixing means 44c, 46c are formed with an acute angle and lie by form fit on the fixing elements 18c, 20c. The harder spoiler part element 34c surrounds the fixing elements 18c, 20c and thus terminates the holding unit 10c laterally. The spring element 16c is let into the longitudinal guidance channel 14c. The spring element 16c is made from spring steel and is provided to form the holding unit 10c in an elastically deflectable manner.

For assembly, first the spring element 16c is introduced into the longitudinal guidance channel 14c. Then the wiper blade 40c is pushed into the piping rail 70c and creates a form fit with the holding element 12c. The spoiler unit 22c is now pushed over the fixing elements 18c, 20c and is then connected therewith by form fit.

Figure 4:
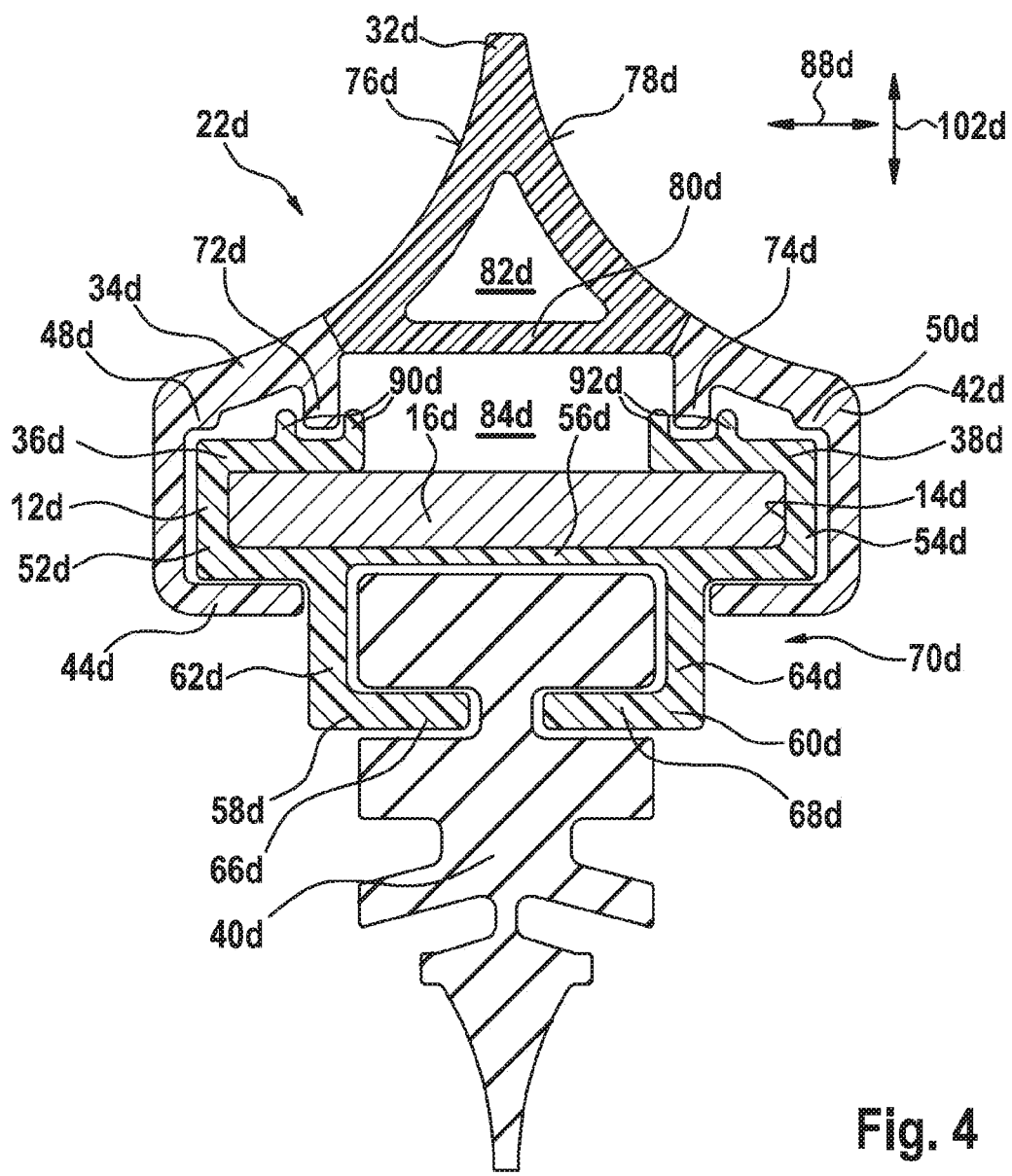
FIG. 4 a cross section view of a further exemplary embodiment of a wiping device with a holding unit.

FIG. 4 shows a cross section view of a further exemplary embodiment of a wiping device according to the invention with a holding unit 10d with a holding element 12d having a longitudinal guidance channel 14d to guide a spring element 16d, and a spoiler unit 22d. The section plane runs perpendicular to a longitudinal direction of the holding element 12d.

The holding unit 10d has channel walls 36d, 38d which are formed integrally with the holding element 12d. The channel walls 36d, 38d border the longitudinal guidance channel 14d on a side facing away from the wiper blade. Two longitudinal extensions 90d, 92d are arranged on each channel wall 36d, 38d on a side facing away from the wiper blade. The spoiler unit 22d has two L-shaped fixing means 44d, 46d and support bodies 48d, 50d adjacent to the fixing means 44d, 46d.

To guide the spring element 16d, side walls 52d, 54d of the longitudinal guidance channel 14d border the channel walls 36d, 38d. The channel walls 36d, 38d here enclose a right angle with the side walls 52d, 54d. Furthermore an intermediate wall 56d is arranged on the side walls 52d, 54d which terminates the longitudinal guidance channel 14d in the direction of a wiper blade 40d. The side walls 52d, 54d extend from the intermediate wall 56d in a direction away from the wiper blade 40d. The holding element 12d has a longitudinal opening 84d which opens the longitudinal guidance channel 14d towards the spoiler unit 22d.

Two L-shaped guide profiles 58d, 60d of the holding unit 10d are arranged on the intermediate wall 56d. The guide profiles 58d, 60d are formed integrally with the holding element 12d. The guide profiles 58d, 60d each have a side guide 62d, 64d and a vertical guide 66d, 68d. The vertical guides 66d, 68d enclose an angle of 90° with the respective side guides 62d, 64d. The vertical guides 66d, 68d point towards each other. The side guides 62d, 64d each enclose an angle of 90° to the intermediate wall 56d. The guide profiles 58d, 60d point in directions towards each other at their free ends of the vertical guides 66d, 68d. The guide profiles. 58d, 60d and the intermediate wall 56d form a piping rail 70d in which the wiper blade 40d is introduced.

The holding element 12d is produced integrally from polyethylene in an extrusion process. A person skilled in the art in this context will consider various plastics which appear suitable such as in particular polypropylene, polyamide, polyvinyl chloride and/or polystyrene.

The spoiler unit 22d is produced in a co-extrusion process from two spoiler part elements 32d, 34d, 42d of different hardness. The first spoiler part element 32d has two spoiler sides 76d, 78d which are formed concave towards the outside. To reinforce the spoiler unit 22d, the first spoiler part element 32d has a connecting web 80d which joins together the concave spoiler sides 76d, 78d. The connecting web 80d and the spoiler sides 76d, 78d surround a longitudinal channel 82d with a triangular cross section.

The first spoiler part element 32d is formed integrally with the second spoiler part element 34d, 42d and is provided to deflect travel wind. The second spoiler part element 34d, 42d has a greater strength and hardness than the first spoiler part element 32d. The L-shaped fixing means 44d, 46d and the support bodies 48d, 50d adjacent to the fixing means 44d, 46d are molded onto the second spoiler part element 34d, 42d. The harder spoiler part element 34d, 42d surrounds the holding element 12d in the region of the longitudinal guidance channel 14d.

Furthermore the second spoiler part element 34a, 42d has two support webs 72d, 74d. The support webs 72d, 74d lie with their free ends on the channel walls 36d, 38d on a side facing away from the wiper blade 40d. The support webs 72d, 74d are provided for transmitting contact forces which occur at the spoiler unit 22d when exposed to travel wind. The support webs 72d, 74d extend over the entire length of the spoiler unit 22d. The longitudinal extensions 90d, 92d partially surround the support webs 72d, 74d in a wiping direction 88d.

The spring element 16d is let into the longitudinal guidance channel 14d. The spring element 16d is made from spring steel and is provided to form the holding unit 10d in an elastically deflectable manner.

For assembly, first the spring element 16d is introduced into the longitudinal guidance channel 14d. Then the wiper blade 40d is pushed into the piping rail 70d and creates a form fit with the holding element 12d. The spoiler unit 22d is now pushed over the holding element 12d and is then connected therewith by form fit.

Figure 5:
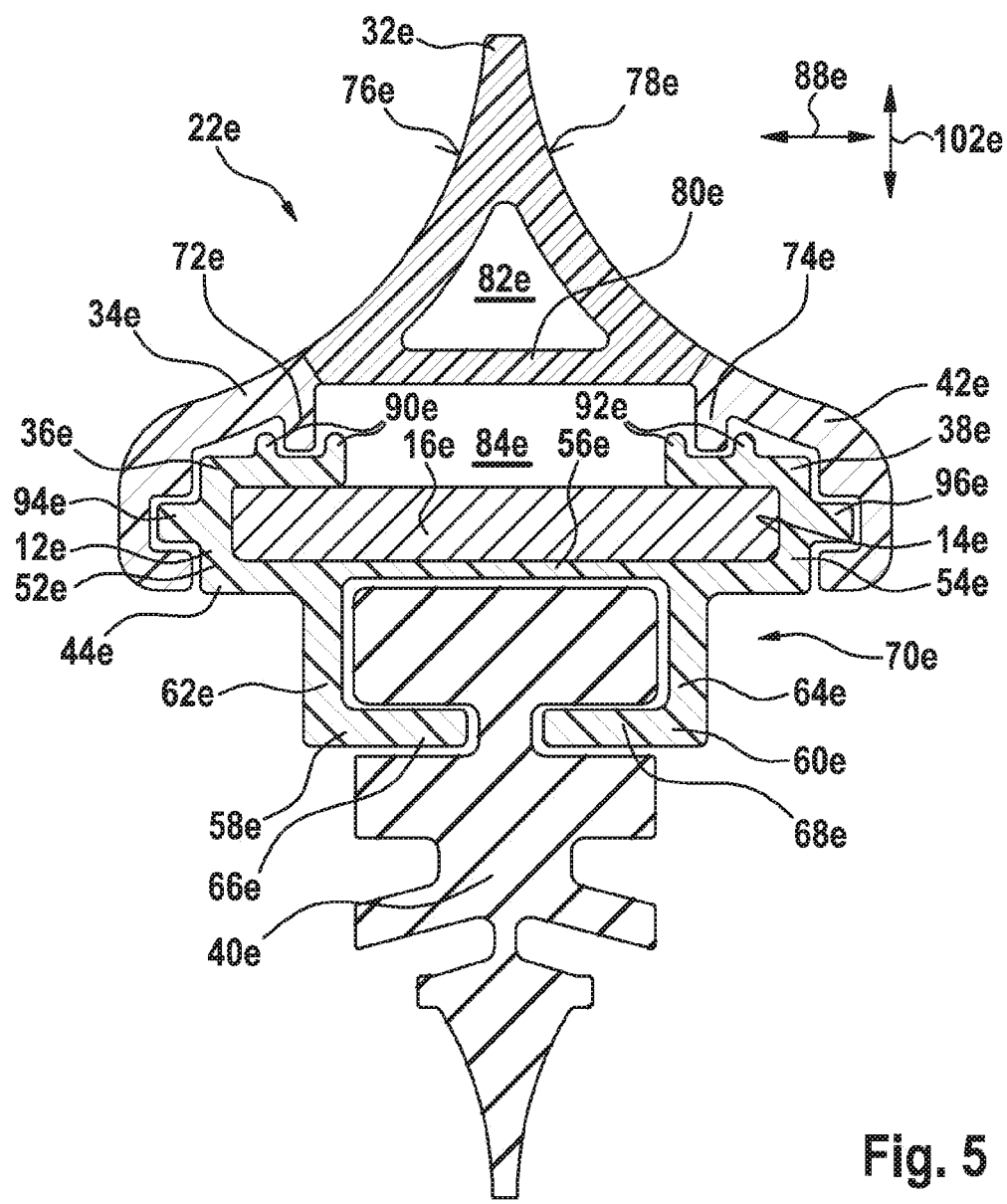
FIG. 5 a cross section view of a further exemplary embodiment of a wiping device with a holding unit.

FIG. 5 shows a cross section view of a further exemplary embodiment of a wiping device according to the invention with a holding unit 10e with a holding element 12e having a longitudinal guidance channel 14e to guide a spring element 16e. The section plane runs perpendicular to a longitudinal direction of the holding element 12e. The wiping device shown substantially corresponds to the exemplary embodiment shown in FIG. 4.

In the region of the longitudinal guidance channel 14e, a side strip 94e, 96e is molded on the holding element 12e on each side pointing in a wiping direction 88e. The side strips 94e, 96e in the mounted state create a form fit with a spoiler unit 22e. The form fit prevents a movement of the spoiler unit 22e relative to the holding element 12e in a vertical direction 102e. The vertical direction 102e extends perpendicular to the longitudinal direction and perpendicular to the wiping direction 88e.

Figure 6:
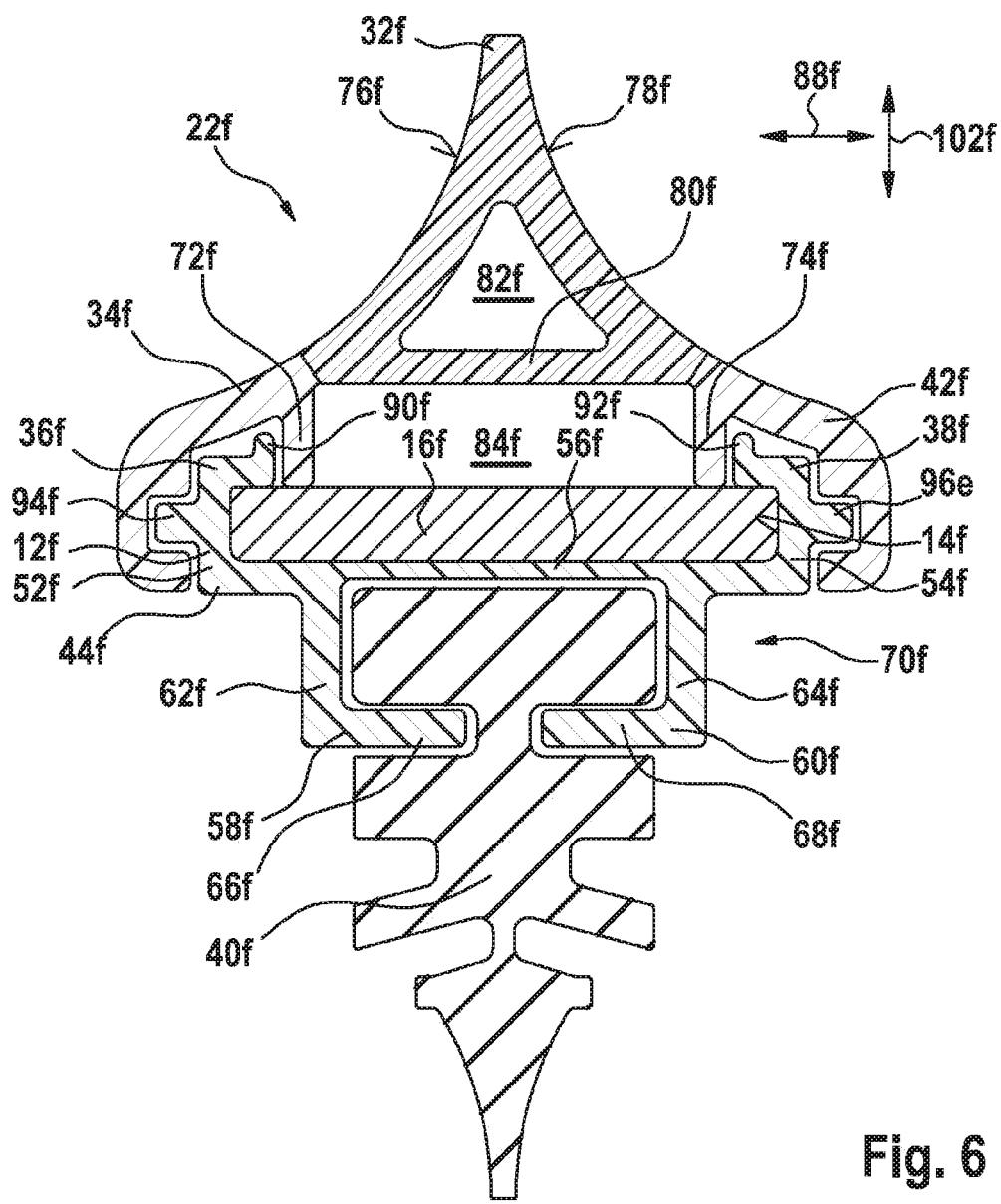
FIG. 6 a cross section view of a further exemplary embodiment of a wiping device with a holding unit.

FIG. 6 shows a cross section view of a further exemplary embodiment of a wiping device according to the invention with a holding unit 10f with a holding element 12f having a longitudinal guidance channel 14f to guide a spring element 16f. The section plane runs perpendicular to a longitudinal direction of the holding element 12f. The wiping device shown substantially corresponds to the exemplary embodiment shown in FIG. 4.

The holding unit 10f has channel walls 36f, 38f which are formed integrally with the holding element 12f. The channel walls 36f, 38f border the longitudinal guidance channel 14f on a side facing away from the wiper blade. A longitudinal extension 90f, 92f is arranged on the channel walls 36f, 38f on a side facing away from the wiper blade.

In the region of the longitudinal guidance channel 14f, a side strip 94f, 96f is molded on the holding element 12f on each side pointing in a wiping direction 88f. The side strips 94f, 96f in the mounted state create a form fit with a spoiler unit 22f. The form fit prevents a movement of the spoiler unit 22f relative to the holding element 12f in a vertical direction 102f. The vertical direction 102f extends perpendicular to the longitudinal direction and perpendicular to the wiping direction 88f.

The spoiler unit 22*f* is produced in a co-extrusion process from two spoiler part elements 32*f*, 34*f*, 42*f* of different hardness. The first spoiler part element 32*f* has two spoiler sides 76*f*, 78*f* which are formed concave towards the outside. To reinforce the spoiler unit 22*f*, the first spoiler part element 32*f* has a connecting web 80*f* which joins together the concave spoiler sides 76*f*, 78*f*. The connecting web 80*f* and the spoiler sides 76*f*, 78*f* surround a longitudinal channel 82*f* with a triangular cross section.

The first spoiler part element 32*f* is formed integrally with the second spoiler part element 34*f*, 42*f* and is provided to deflect travel wind. The second spoiler part element 34*f*, 42*f* has a greater strength and hardness than the first spoiler part element 32*f*. The L-shaped fixing means 44*f*, 46*f* and the support bodies 48*f*, 50*f* adjacent to the fixing means 44*f*, 46*f* are molded onto the second spoiler part element 34*f*, 42*f*. The harder spoiler part element 34*f*, 42*f* surrounds the holding element 12*f* in the region of the longitudinal guidance channel 14*f*.

Furthermore the second spoiler part element 34*f*, 42*f* has two support webs 72*f*, 74*f*. The support webs 72*f*, 74*f* lie with their free ends on the spring element 16*f* on a side facing away from the wiper blade 40*f*. The support webs 72*f*, 74*f* are provided for transmitting contact forces which occur at the spoiler unit 22*f* when exposed to travel wind. The support webs 72*f*, 74*f* extend over the entire length of the spoiler unit 22*f*. The longitudinal extensions 90*f*, 92*f* lie partially on the support webs 72*f*, 74*f* in a wiping direction 88*f*.

Figure 7:
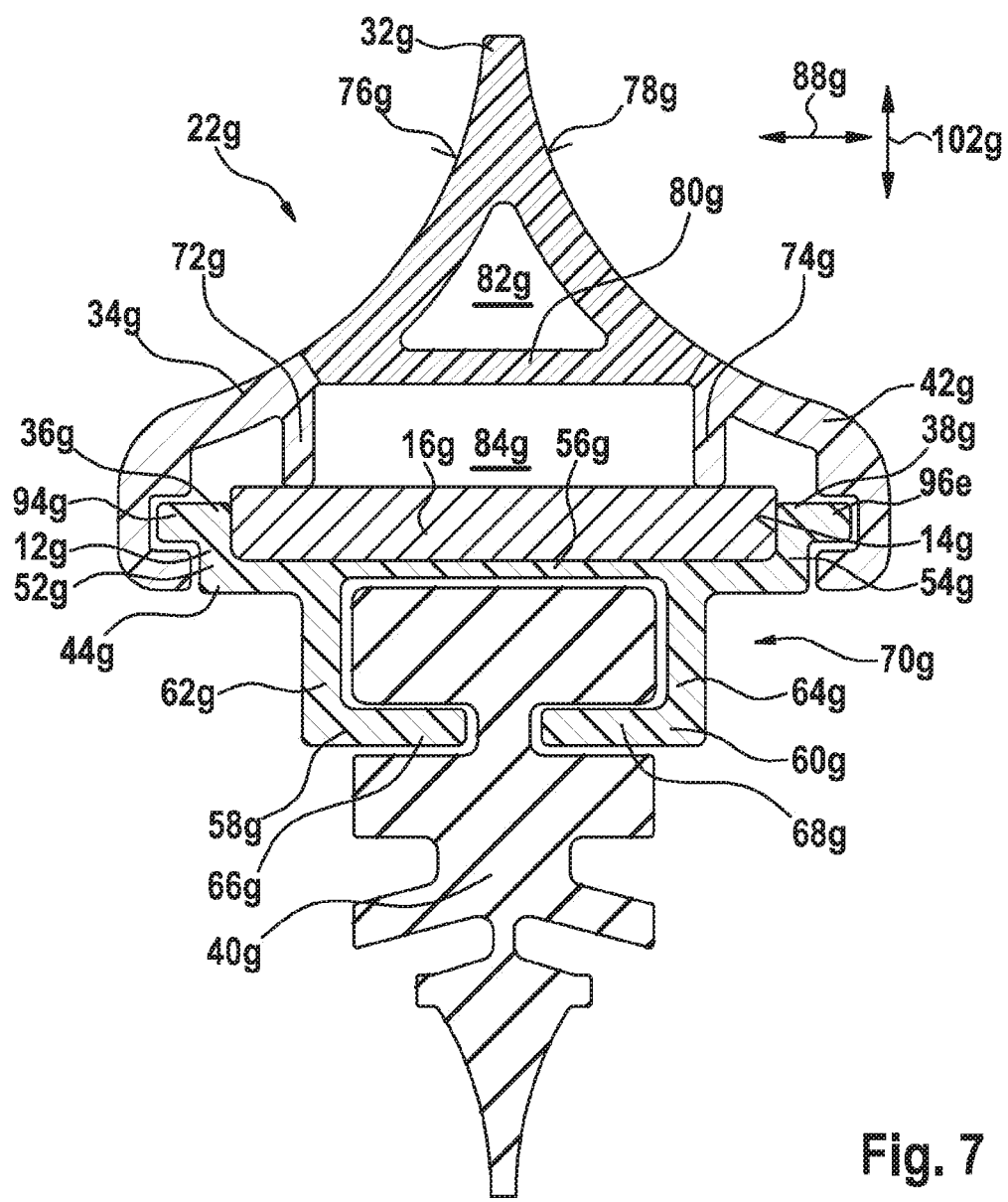
FIG. 7 a cross section view of a further exemplary embodiment of a wiping device with a holding unit.

FIG. 7 shows a cross section view of a further exemplary embodiment of a wiping device according to the invention with a holding unit 10*g* with a holding element 12*g* having a longitudinal guidance channel 14*g* to guide a spring element 16*g*, and a spoiler unit 22*g*. The section plane runs perpendicular to a longitudinal direction of the holding element 12*g*.

The longitudinal guidance channel 14*g* is formed as a trough. The longitudinal guidance channel 14*g* is open over the entire width and length in the direction of the spoiler unit 22*g*.

To guide the spring element 16*g*, the longitudinal guidance channel 14*g* has side walls 52*g*, 54*g*. Furthermore an intermediate wall 56*g* is arranged on the side walls 52*g*, 54*g* which terminates the longitudinal guidance channel 14*g* in the direction of a wiper blade 40*g*. The side walls 52*g*, 54*g* extend from the intermediate wall 56*g* in a direction away from the wiper blade 40*g*. The holding element 12*g* has a longitudinal opening 84*g* which opens the longitudinal guidance channel 14*g* completely towards the spoiler unit 22*g*.

Two L-shaped guide profiles 58*g*, 60*g* of the holding unit 10*g* are arranged on the intermediate wall 56*g*. The guide profiles 58*g*, 60*g* are formed integrally with the holding element 12*g*. The guide profiles 58*g*, 60*g* each have a side guide 62*g*, 64*g* and a vertical guide 66*g*, 68*g*. The vertical guides 66*g*, 68*g* enclose an angle of 90° with the respective side guides 62*g*, 64*g*. The vertical guides 66*g*, 68*g* point towards each other. The side guides 62*g*, 64*g* each enclose an angle of 90° to the intermediate wall 56*g*. The guide profiles 58*g*, 60*g* point in directions towards each other at their free ends of the vertical guides 66*g*, 68*g*. The guide profiles 58*g*, 60*g* and the intermediate wall 56*g* form a piping rail 70*g* in which the wiper blade 40*g* is introduced.

The holding element 12*g* is produced integrally from polyethylene in an extrusion process. A person skilled in the art in this context will consider various plastics which appear suitable such as in particular polypropylene, polyamide, polyvinyl chloride and/or polystyrene.

The spoiler unit 22*g* is produced in a co-extrusion process from two spoiler part elements 32*g*, 34*g*, 42*g* of different hardness. The first spoiler part element 32*g* has two spoiler sides 76*g*, 78*g* which are formed concave towards the outside. To reinforce the spoiler unit 22*g*, the first spoiler part element 32*g* has a connecting web 80*g* which joins together the concave spoiler sides 76*g*, 78*g*. The connecting web 80*g* and the spoiler sides 76*g*, 78*g* surround a longitudinal channel 82*g* with a triangular cross section.

The first spoiler part element 32*g* is formed integrally with the second spoiler part element 34*g*, 42*g* and is provided to deflect travel wind. The second spoiler part element 34*g*, 42*g* has a greater strength and hardness than the first spoiler part element 32*g*. The L-shaped fixing means 44*g*, 46*g* and the support bodies 48*g*, 50*g* adjacent to the fixing means 44*g*, 46*g* are molded onto the second spoiler part element 34*g*, 42*g*. The harder spoiler part element 34*g*, 42*g* surrounds the holding element 12*g* in the region of the longitudinal guidance channel 14*g*.

Furthermore the second spoiler part element 34*g*, 42*g* has two support webs 72*g*, 74*g*. The support webs 72*g*, 74*g* lie with their free ends on spring element 16*g* on a side facing away from the wiper blade 40*g*. The support webs 72*g*, 74*g* are provided for transmitting contact forces which occur at the spoiler unit 22*g* when exposed to travel wind. The support webs 72*g*, 74*g* extend over the entire length of the spoiler unit 22*g*. The support webs 72*g*, 74*g* prevent a movement of the spring element 16*g* in a vertical direction 102*g*. The vertical direction 102*g* extends perpendicular to the longitudinal direction and perpendicular to the wiping direction 88*g*.

The spring element 16*g* is let into the longitudinal guidance channel 14*g*. The spring element 16*g* is made from spring steel and is provided to form the holding unit 10*g* in an elastically deflectable manner.

For assembly, first the spring element 16*g* is introduced into the longitudinal guidance channel 14*g*. Then the wiper blade 40*g* is pushed into the piping rail 70*g* and creates a form fit with the holding element 12*g*. The spoiler unit 22*g* is now pushed over the holding element 12*g* and is then connected therewith by form fit.

Figure 8:
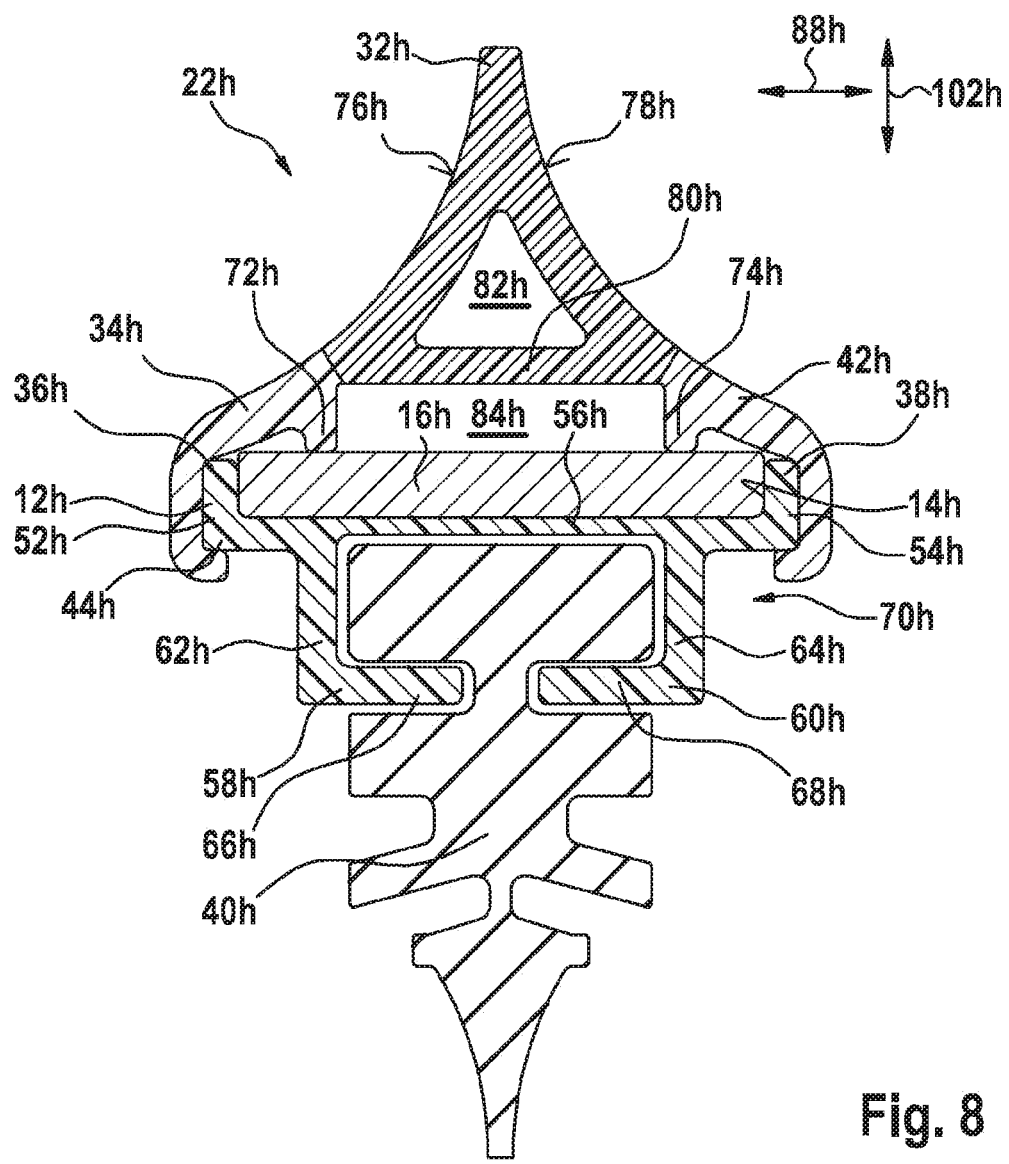
FIG. 8 a cross section view of a further exemplary embodiment of a wiping device with a holding unit.

FIG. 8 shows a cross section view of a further exemplary embodiment of a wiping device according to the invention with a holding unit 10*h* with a holding element 12*h* having a longitudinal guidance channel 14*h* to guide a spring element 16*h*, and a spoiler unit 22*h*. The section plane runs perpendicular to a longitudinal direction of the holding element 12*h*.

The longitudinal guidance channel 14*h* is formed as a trough. The longitudinal guidance channel 14*h* is open over the entire width and length in the direction of the spoiler unit 22*h*.

To guide the spring element 16*h*, the longitudinal guidance channel 14*h* has side walls 52*h*, 54*h*. Furthermore an intermediate wall 56*h* is arranged on the side walls 52*h*, 54*h* which terminates the longitudinal guidance channel 14*h* in the direction of a wiper blade 40*h*. The side walls 52*h*, 54*h* extend from the intermediate wall 56*h* in a direction away from the wiper blade 40*h*. The holding element 12*h* has a longitudinal opening 84*h* which opens the longitudinal guidance channel 14*h* completely towards the spoiler unit 22*h*.

Two L-shaped guide profiles 58*h*, 60*h* of the holding unit 10*h* are arranged on the intermediate wall 56*h*. The guide profiles 58*h*, 60*h* are formed integrally with the holding element 12*h*. The guide profiles 58*h*, 60*h* each have a side guide 62*h*, 64*h* and a vertical guide 66*h*, 68*h*. The vertical guides 66*h*, 68*h* enclose an angle of 90° with the respective side guides 62h, 64h. The vertical guides 66h, 68h point towards each other. The side guides 62h, 64h each enclose an angle of 90° to the intermediate wall 56h. The guide profiles 58h, 60h point in directions towards each other at their free ends of the vertical guides 66h, 68h. The guide profiles 58h, 60h and the intermediate wall 56h form a piping rail 70h in which the wiper blade 40h is introduced.

The holding element 12h is produced integrally from polyethylene in an extrusion process. A person skilled in the art in this context will consider various plastics which appear suitable such as in particular polypropylene, polyamide, polyvinyl chloride and/or polystyrene.

The spoiler unit 22h is produced in a co-extrusion process from two spoiler part elements 32h, 34h, 42h of different hardness. The first spoiler part element 32h has two spoiler sides 76h, 78h which are formed concave towards the outside. To reinforce the spoiler unit 22h, the first spoiler part element 32h has a connecting web 80h which joins together the concave spoiler sides 76h, 78h. The connecting web 80h and the spoiler sides 76h, 78h surround a longitudinal channel 82h with a triangular cross section.

The first spoiler part element 32h is formed integrally with the second spoiler part element 34h, 42h and is provided to deflect travel wind. The second spoiler part element 34h, 42h has a greater strength and hardness than the first spoiler part element 32h. The L-shaped fixing means 44h, 46h are molded onto the second spoiler part element 34h, 42h. The harder spoiler part element 34h, 42h surrounds the holding element 12h in the region of the longitudinal guidance channel 14h.

Furthermore the second spoiler part element 34h, 42h has two support webs 72h, 74h. The support webs 72h, 74h lie with their free ends on spring element 16h on a side facing away from the wiper blade 40h. The support webs 72h, 74h are provided for transmitting contact forces which occur at the spoiler unit 22h when exposed to travel wind. The support webs 72h, 74h extend over the entire length of the spoiler unit 22h. The support webs 72h, 74h prevent a movement of the spring element 16h in a vertical direction 102h. The vertical direction 102h extends perpendicular to the longitudinal direction and perpendicular to the wiping direction 88h.

The spring element 16h is let into the longitudinal guidance channel 14h. The spring element 16h is made from spring steel and is provided to form the holding unit 10h in an elastically deflectable manner.

For assembly, first the spring element 16h is introduced into the longitudinal guidance channel 14h. Then the wiper blade 40h is pushed into the piping rail 70h and creates a form fit with the holding element 12h. The spoiler unit 22h is now pushed over the holding element 12h and is then connected therewith by form fit.

Figure 9:
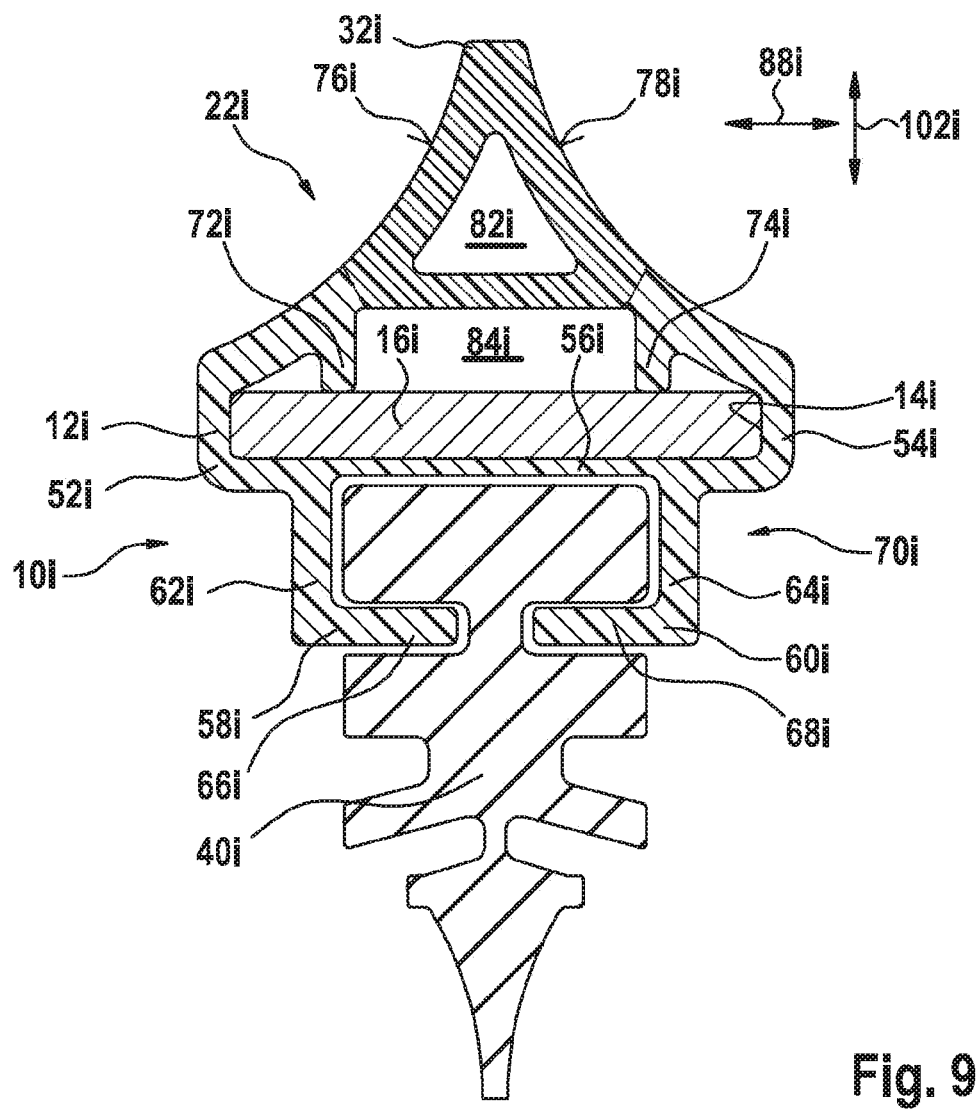
FIG. 9 a cross section view of a further exemplary embodiment of a wiping device with a holding unit.

FIG. 9 shows a cross section view of a further exemplary embodiment of a wiping device according to the invention with a holding unit 10i with a holding element 12i having a longitudinal guidance channel 14i to guide a spring element 16i, and a spoiler unit 22i. The section plane runs perpendicular to a longitudinal direction of the holding element 12i.

The longitudinal guidance channel 14i is formed as a trough. The longitudinal guidance channel 14i is open over the entire width and length in the direction of the spoiler unit 22i.

To guide the spring element 16i, the longitudinal guidance channel 14i has side walls 52i, 54i. Furthermore an intermediate wall 56i is arranged on the side walls 52i, 54i which terminates the longitudinal guidance channel 14i in the direction of a wiper blade 40i. The side walls 52i, 54i extend from the intermediate wall 56i in a direction away from the wiper blade 40i. The holding element 12i has a longitudinal opening 84i which opens the longitudinal guidance channel 14i completely towards the spoiler unit 22i.

Two L-shaped guide profiles 58i, 60i of the holding unit 10i are arranged on the intermediate wall 56i. The guide profiles 58i, 60i are formed integrally with the holding element 12i. The guide profiles 58i, 60i each have a side guide 62i, 64i and a vertical guide 66i, 68i. The vertical guides 66i, 68i enclose an angle of 90° with the respective side guides 62i, 64i. The vertical guides 66i, 68i point towards each other. The side guides 62i, 64i each enclose an angle of 90° to the intermediate wall 56i. The guide profiles 58i, 60i point in directions towards each other at their free ends of the vertical guides 66i, 68i. The guide profiles 58i, 60i and the intermediate wall 56i form a piping rail 70i in which the wiper blade 40i is introduced.

The spoiler unit 22i is produced in a co-extrusion process from two spoiler part elements 32i, 34i of different hardness. The first spoiler part element 32i has two spoiler sides 76i, 78i which are formed concave towards the outside. To reinforce the spoiler unit 22i, the first spoiler part element 32i has a connecting web 80i which joins together the concave spoiler sides 76i, 78i. The connecting web 80i and the spoiler sides 76i, 78i surround a longitudinal channel 82i with a triangular cross section.

The first spoiler part element 32i is formed integrally with the second spoiler part element 34i and is provided to deflect travel wind. The second spoiler part element 34i has a greater strength and hardness than the first spoiler part element 32i. The second spoiler part element 34i is formed integrally with the holding element 12i and made from a plastic. A person skilled in the art in this context will consider various plastics which appear suitable such as in particular polyethylene, polypropylene, polyamide, polyvinyl chloride and/or polystyrene.

Furthermore the second spoiler part element 34i has two support webs 72i, 74i. The support webs 72i, 74i lie with their free ends on spring element 16i on a side facing away from the wiper blade 40i. The support webs 72i, 74i are provided for transmitting contact forces which occur at the spoiler unit 22i when exposed to travel wind. The support webs 72i, 74i extend over the entire length of the spoiler unit 22i. The support webs 72i, 74i prevent a movement of the spring element 16i in a vertical direction 102i. The vertical direction 102i extends perpendicular to the longitudinal direction and perpendicular to the wiping direction 88i.

The spring element 16i is let into the longitudinal guidance channel 14i. The spring element 16i is made from spring steel and is provided to form the holding unit 10i in an elastically deflectable manner.

For assembly, first the spring element 16i is introduced into the longitudinal guidance channel 14i. Then the wiper blade 40i is pushed into the piping rail 70i and creates a form fit with the holding element 12i.

Figure 10:
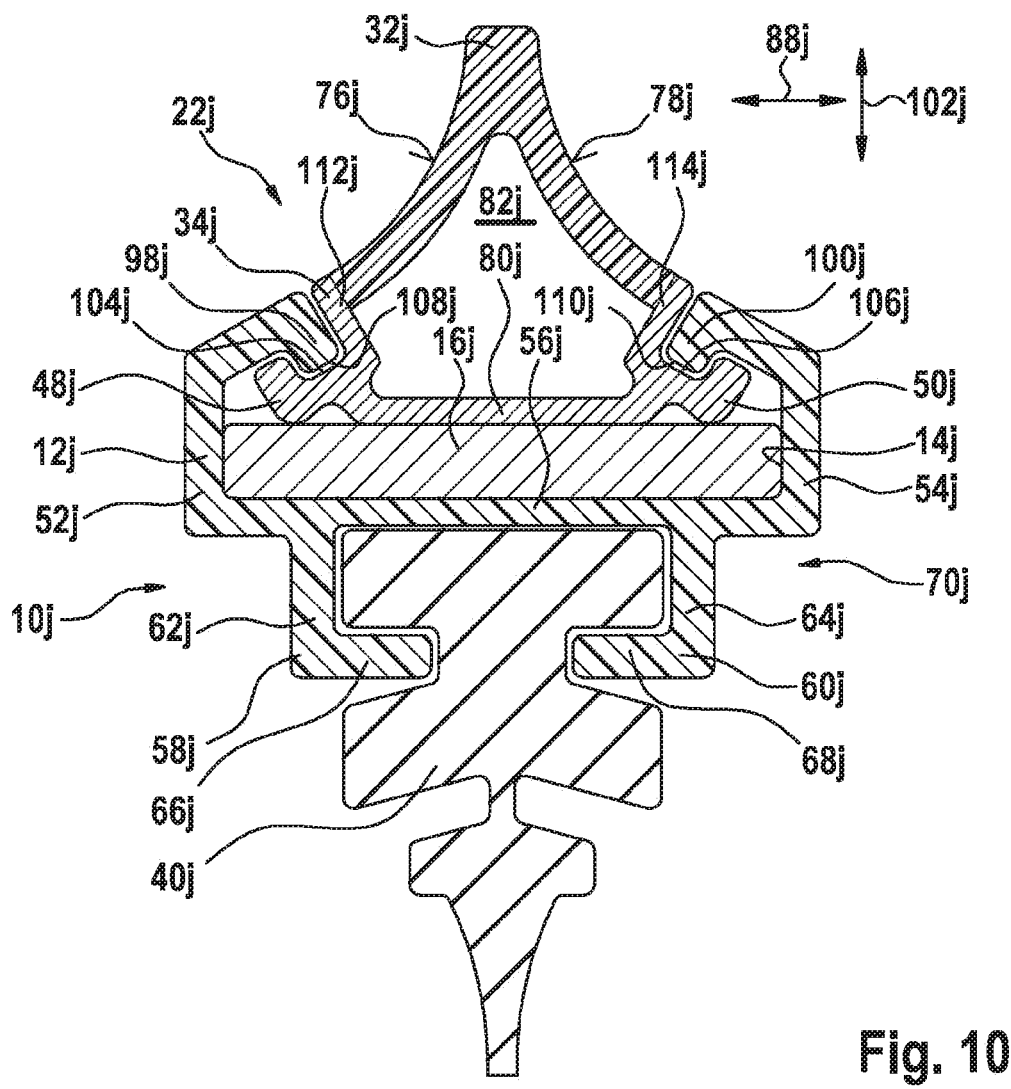
FIG. 10 a cross section view of a further exemplary embodiment of a wiping device with a holding unit.

FIG. 10 shows a cross section view of a further exemplary embodiment of a wiping device according to the invention with a holding unit 10j with a holding element 12j having a longitudinal guidance channel 14j to guide a spring element 16j, and a spoiler unit 22j. The section plane runs perpendicular to a longitudinal direction of the holding element 12j.

To guide the spring element 16j, the longitudinal guidance channel 14j has side walls 52j, 54j. Furthermore an intermediate wall 56j is arranged on the side walls 52j, 54j which terminates the longitudinal guidance channel 14j in the direction of a wiper blade 40j. The side walls 52j, 54j extend from the intermediate wall 56j in a direction away from the wiper blade 40j. A fixing means 98j, 100j is molded onto each side wall 52j, 54j and with its free end 108j, 110j faces the longitudinal guidance channel 14j. The fixing means 98j, 100j are formed L-shaped and border the side walls 52j, 54j at an obtuse angle of 60°.

Two L-shaped guide profiles 58j, 60j of the holding unit 10j are arranged on the intermediate wall 56j. The guide profiles 58j, 60j are formed integrally with the holding element 12j. The guide profiles 58j, 60j each have a side guide 62j, 64j and a vertical guide 66j, 68j. The vertical guides 66j, 68j enclose an angle of 90° with the respective side guides 62j, 64j. The vertical guides 66j, 68j point towards each other. The side guides 62j, 64j each enclose an angle of 90° to the intermediate wall 56j. The guide profiles 58j, 60j point in directions towards each other at their free ends of the vertical guides 66j, 68j. The guide profiles 58j, 60j and the intermediate wall 56j form a piping rail 70j in which the wiper blade 40j is introduced.

The spoiler unit 22j is produced in a co-extrusion process from two spoiler part elements 32j, 34j of different hardness. The first spoiler part element 32j has two spoiler sides 76j, 78j which are formed concave towards the outside. To reinforce the spoiler unit 22j, the first spoiler part element 32j has a connecting web 80j which joins together the concave spoiler sides 76j, 78j. The connecting web 80j and the spoiler sides 76j, 78j surround a longitudinal channel 82j which has a substantially pentagonal cross section.

The first spoiler part element 32j is formed integrally with the second spoiler part element 34j and is provided to deflect travel wind. The second spoiler part element 34j has a greater strength and hardness than the first spoiler part element 32j. The first spoiler part element 32j lies on two fixing webs 112j, 114j which are formed integrally with the connecting web 80j. The fixing webs 112j, 114j enclose an angle of 60° with the connecting web 80j. The second spoiler part element 34j has two fixing grooves 104j, 106j which create a form fit with the fixing means 98j, 100j.

The holding element 12j is produced integrally from polyethylene in an extrusion process. A person skilled in the art in this context will consider various plastics which appear suitable such as in particular polypropylene, polyamide, polyvinyl chloride and/or polystyrene.

The free ends 108j, 110j of the fixing means 98j, 100j are surrounded by the second spoiler part element 34j. The harder spoiler part element 34j here lies on the fixing means 98j, 100j by form fit. The harder spoiler part element 34j has two support bodies 48j, 50j which lie on the fixing means 98j, 100j and on the spring element 16j. A connecting web 80j joins the support bodies 48j, 50j together.

The spring element 16j is let into the longitudinal guidance channel 14j. The spring element 16j is made from spring steel and is provided to form the holding unit 10j in an elastically deflectable manner.

For assembly, first the spring element 16j is introduced into the longitudinal guidance channel 14j. Then the wiper blade 40j is pushed into the piping rail 70j and creates a form fit with the holding element 12j. The spoiler unit 22j is now pushed into the holding element 12j and is then connected therewith by form fit.

Figure 11:
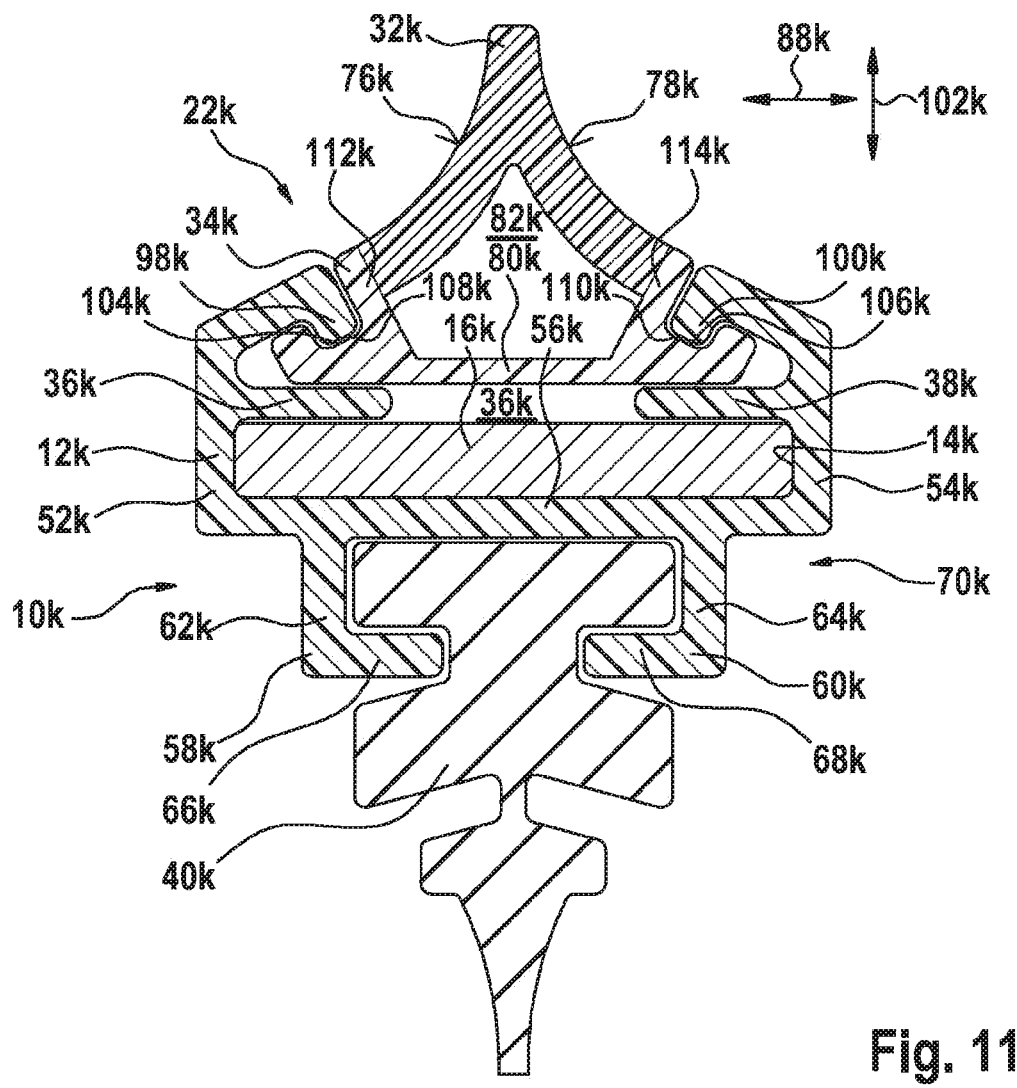
FIG. 11 a cross section view of a further exemplary embodiment of a wiping device with a holding unit.

FIG. 11 shows a cross section view of a further exemplary embodiment of a wiping device according to the invention with a holding unit 10k with a holding element 12k having a longitudinal guidance channel 14k to guide a spring element 16k, and a spoiler unit 22k. The section plane runs perpendicular to a longitudinal direction of the holding element 12k. The wiping device shown substantially corresponds to the exemplary embodiment shown in FIG. 10.

The holding element 12k has two channel walls 36k, 38k which border the longitudinal guidance channel 14k. The channel walls 36k, 38k extend parallel to a wiping direction 88k and partially terminate the longitudinal guidance channel 14k in a direction facing away from the wiper blade 40k. The holding element 12k furthermore has a longitudinal opening 84k which opens the longitudinal guidance channel 14k towards the spoiler unit 22k.

The spoiler unit 22k is produced in a co-extrusion process from two spoiler part elements 32k, 34k of different hardness. The first spoiler part element 32k has two spoiler sides 76k, 78k which are formed concave towards the outside. To reinforce the spoiler unit 22k, the first spoiler part element 32k has a connecting web 80k which joins together the concave spoiler sides 76k, 78k. The connecting web 80k and the spoiler sides 76k, 78k surround a longitudinal channel 82k which has a substantially pentagonal cross section.

The harder spoiler part element 34k has two support bodies 48k, 50k which lie on the fixing means 98k, 100k and on the channel walls 36k, 38k. A connecting web 80k joins the support bodies 48k, 50k together. The connecting web 80k lies on the channel walls 36k, 38k. The first spoiler part element 32k lies on two fixing webs 112k, 114k which are formed integrally with the connecting web 80k. The fixing webs 112k, 114k enclose an angle of 60° with the connecting web 80k. A width of the first spoiler part element 32k corresponds to twice the width of the fixing webs 112k, 114k.

Figure 12:
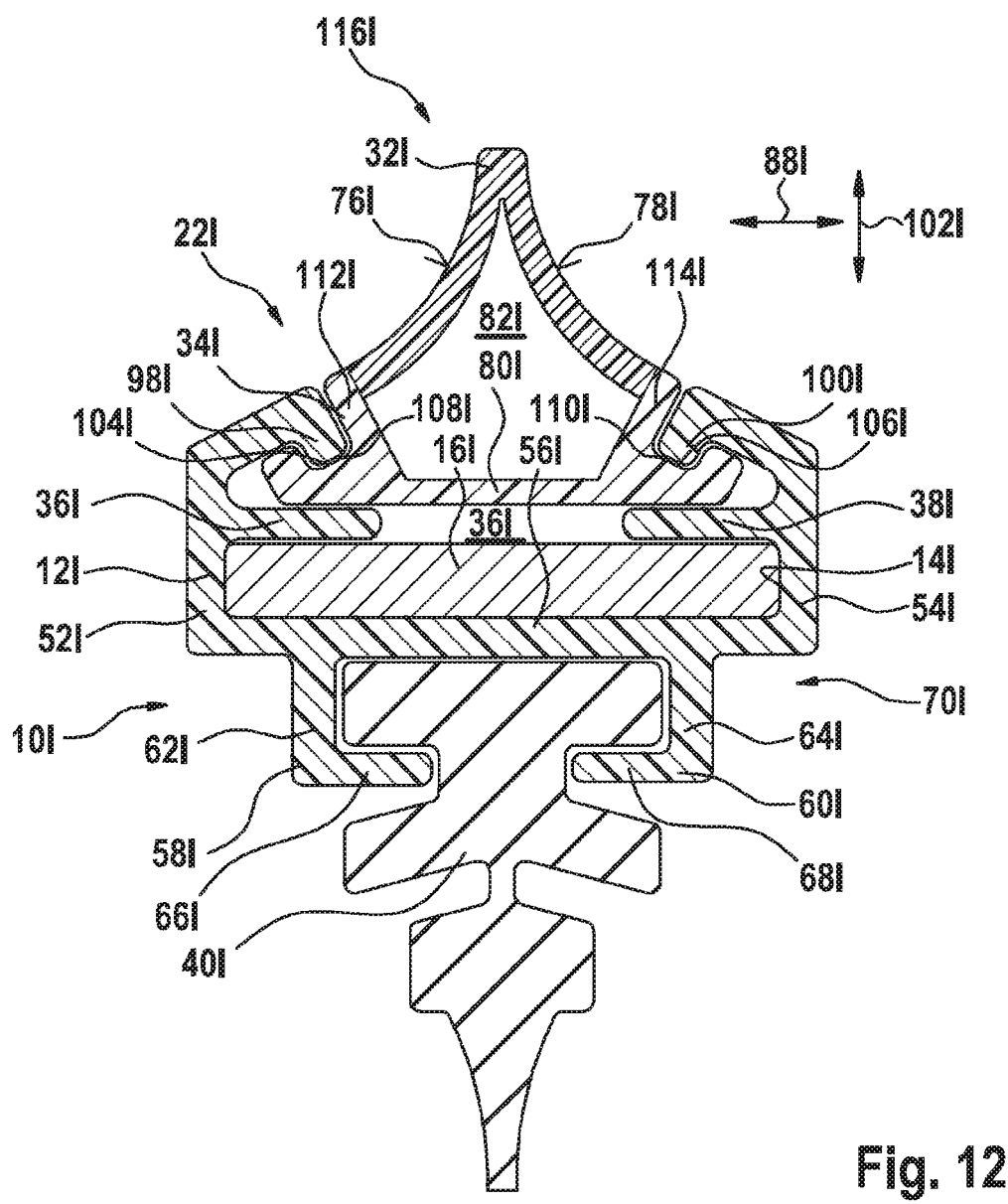
FIG. 12 a cross section view of a further exemplary embodiment of a wiping device with a holding unit.

FIG. 12 shows a cross section view of a further exemplary embodiment of a wiping device according to the invention with a holding unit 10l with a holding element 12l having a longitudinal guidance channel 14l to guide a spring element 16l. The section plane runs perpendicular to a longitudinal direction of the holding element 12l. The wiping device shown substantially corresponds to the exemplary embodiment shown in FIG. 1l. A width of a first spoiler part element 32l corresponds to the width of the fixing webs 112l, 114l. The first spoiler part element 32l runs together pointed in an end region 116l facing away from the wiper blade 40l.

Figure 13:
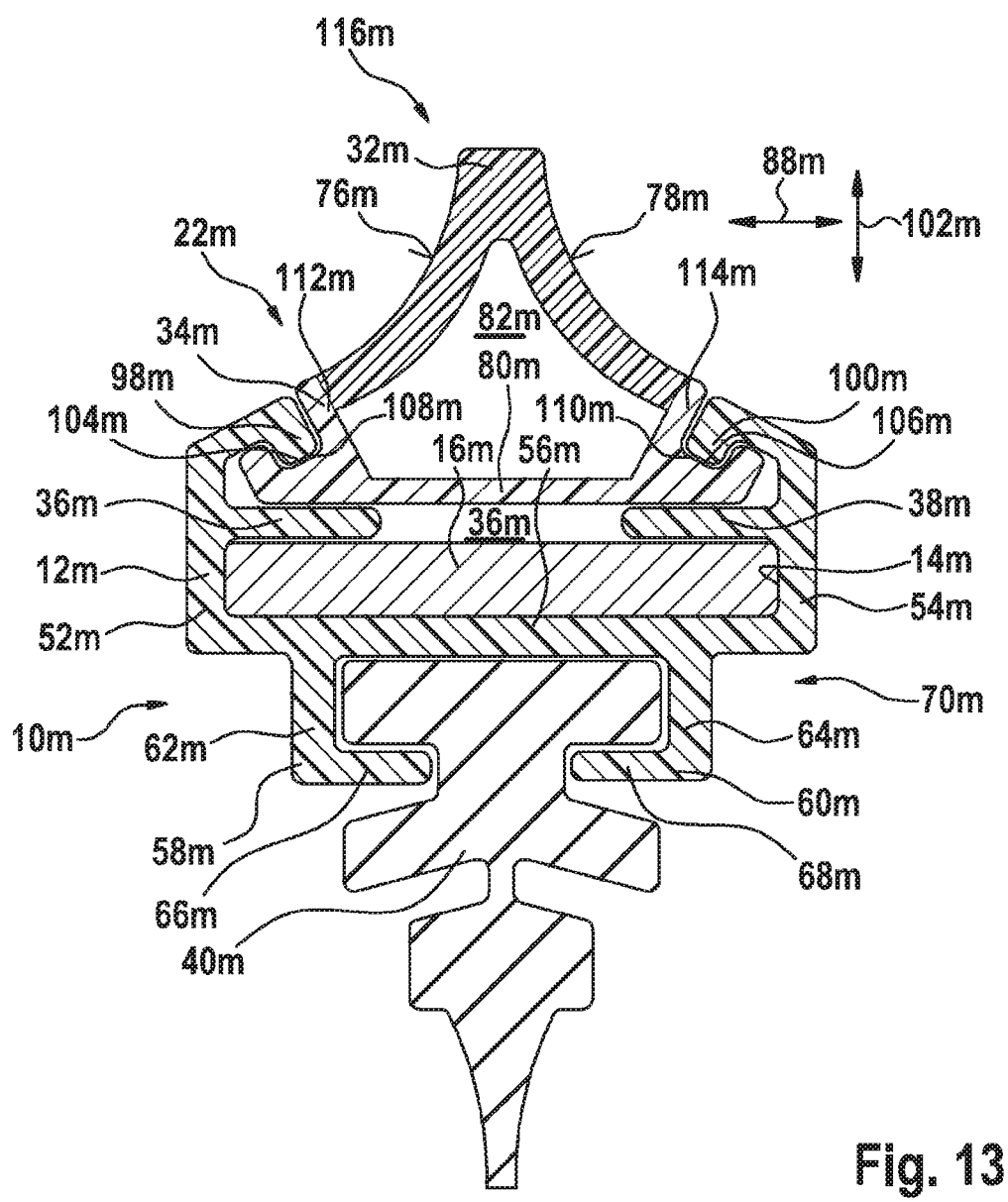
FIG. 13 a cross section view of a further exemplary embodiment of a wiping device with a holding unit.

FIG. 13 shows a cross section view of a further exemplary embodiment of a wiping device according to the invention with a holding unit 10m with a holding element 12m having a longitudinal guidance channel 14m to guide a spring element 16m, and a spoiler unit 22m. The section plane runs perpendicular to a longitudinal direction of the holding element 12m. The wiping device shown substantially corresponds to the exemplary embodiment shown in FIG. 12. A width of a first spoiler part element 32m corresponds to the width of the fixing webs 112m, 114m. The first spoiler part element 32m runs together rounded in an end region 116m facing away from a wiper blade 40m.

Figure 14:
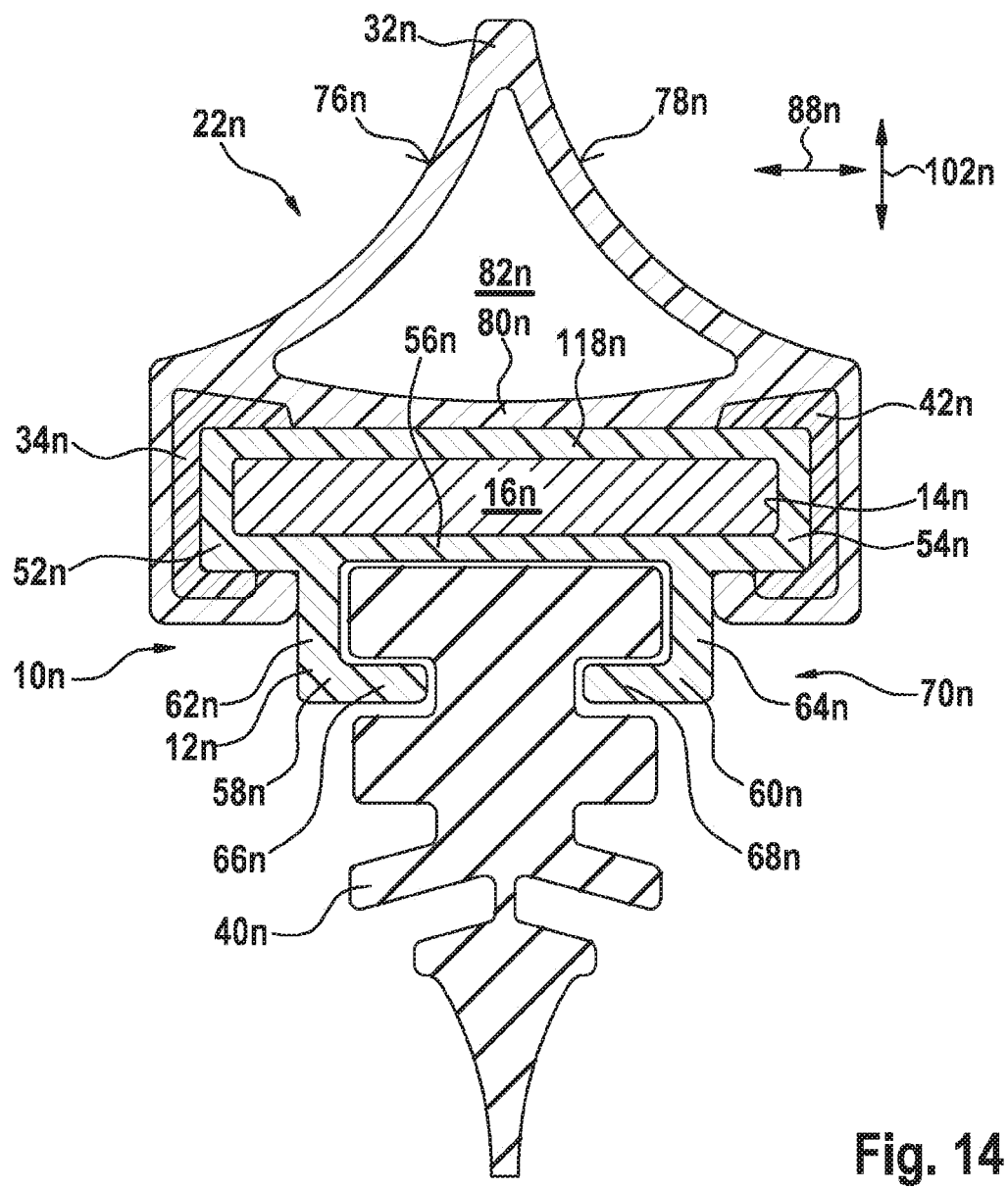
FIG. 14 a cross section view of a further exemplary embodiment of a wiping device with a holding unit.

FIG. 14 shows a cross section view of a further exemplary embodiment of a wiping device according to the invention with a holding unit 10n with a holding element 12n having a longitudinal guidance channel 14n to guide a spring element 16n. The section plane runs perpendicular to a longitudinal direction of the holding element 12n.

To guide the spring element 16n, the longitudinal guidance channel 14n has side walls 52n, 54n. Furthermore an intermediate wall 56n is arranged on the side walls 52n, 54n which terminates the longitudinal guidance channel 14n in the direction of a wiper blade 40n. The side walls 52n, 54n extend from the intermediate wall 56n in a direction away from the wiper blade 40n. A second intermediate wall 118n terminates the longitudinal guidance channel 14n in the direction of a spoiler unit 22n. Thus the longitudinal guidance channel 14n is completely surrounded.

Two L-shaped guide profiles $58n$, $60n$ of the holding unit $10n$ are arranged on the intermediate wall $56n$. The guide profiles $58n$, $60n$ are formed integrally with the holding element $12n$. The guide profiles $58n$, $60n$ each have a side guide $62n$, $64n$ and a vertical guide $66n$, $68n$. The vertical guides $66n$, $68n$ enclose an angle of 90° with the respective side guides $62n$, $64n$. The vertical guides $66n$, $68n$ point towards each other. The side guides $62n$, $64n$ each enclose an angle of 90° to the intermediate wall $56n$. The guide profiles $58n$, $60n$ point in directions towards each other at their free ends of the vertical guides $66n$, $68n$. The guide profiles $58n$, $60n$ and the intermediate wall $56n$ form a piping rail $70n$ in which the wiper blade $40n$ is introduced.

The spoiler unit $22n$ is produced in a co-extrusion process from two spoiler part elements $32n$, $34n$, $42n$ of different hardness. The first spoiler part element $32n$ has two spoiler sides $76n$, $78n$ which are formed concave towards the outside. To reinforce the spoiler unit $22n$, the first spoiler part element $32n$ has a connecting web $80n$ which joins together the concave spoiler sides $76n$, $78n$. The connecting web $80n$ and the spoiler sides $76n$, $78n$ surround a longitudinal channel $82n$ which has a substantially pentagonal cross section.

The first spoiler part element $32n$ is formed integrally with the second spoiler part element $34n$, $42n$ and is provided to deflect travel wind. The second spoiler part element $34n$, $42n$ has a greater strength and hardness than the first spoiler part element $32n$.

The second spoiler part elements $34n$, $42n$ lie on the holding element $12n$ by form fit in the region of the longitudinal guidance channel $14n$ and partially surround the longitudinal guidance channel $14n$. The second spoiler part elements $34n$, $42n$ each have three walls. The first and second walls enclose an angle of 90°. The second wall encloses an angle of 77° with the third wall, which can lead to a high torsional rigidity.

The second spoiler part elements $34n$, $42n$ are surrounded by the first spoiler part element $32n$ in both a wiping direction $88n$ and a vertical direction $102n$. Contact of the second spoiler part elements $34n$, $42n$ with an environment is thus avoided.

The holding element $12n$ is produced integrally from polyethylene in an extrusion process. A person skilled in the art in this context will consider various plastics which appear suitable such as in particular polypropylene, polyamide, polyvinyl chloride and/or polystyrene.

The spring element $16n$ is let into the longitudinal guidance channel $14n$. The spring element $16n$ is made from spring steel and is provided to form the holding unit $10n$ in an elastically deflectable manner.

For assembly, first the spring element $16n$ is introduced into the longitudinal guidance channel $14n$. Then the wiper blade $40n$ is pushed into the piping rail $70n$ and creates a form fit with the holding element $12n$. The spoiler unit $22n$ is now pushed over the holding element $12n$ and is then connected therewith by form fit.

Figure 15:
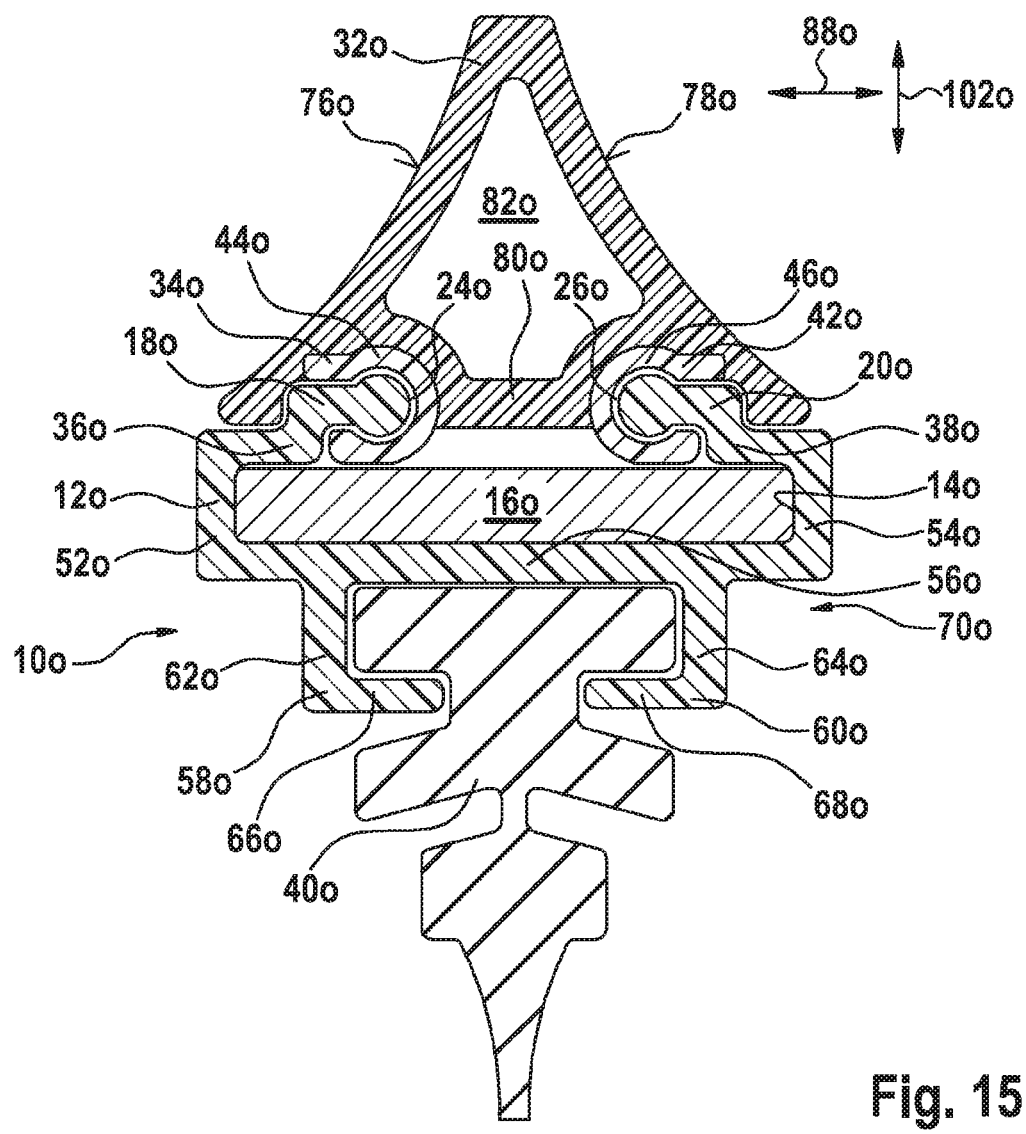
FIG. 15 a cross section view of a further exemplary embodiment of a wiping device with a holding unit.

FIG. 15 shows a cross section view of a further exemplary embodiment of a wiping device according to the invention with a holding unit $10o$ with a holding element $12o$ having a longitudinal guidance channel $14o$ to guide a spring element $16o$. The section plane runs perpendicular to a longitudinal direction of the holding element $12o$.

The holding element $12o$ has two fixing elements $18o$, $20o$. The fixing elements $18o$, $20o$ are formed integrally with the holding element $12o$. At their free ends $24o$, $26o$, the fixing elements $18o$, $20o$ point in directions away from each other. Furthermore the fixing elements $18o$, $20o$ form two channel walls $36o$, $38o$ which border the longitudinal guidance channel $14o$ on a side facing away from the wiper blade. In the region of their free ends $24o$, $26o$, the fixing elements $18o$, $20o$ are formed as piping. The ends $24o$, $26o$ are surrounded by a spoiler unit $22o$. For this the spoiler unit $22o$ has two fixing means $44o$, $46o$. The fixing means $44o$, $46o$ each form a C-shaped receiving region and hence a piping rail.

To guide the spring element $16o$, side walls $52o$, $54o$ of the longitudinal guidance channel $14o$ border the channel walls $36o$, $38o$. The channel walls $36o$, $38o$ here enclose a right angle with the side walls $52o$, $54o$. Furthermore an intermediate wall $56o$ is arranged on the side walls $52o$, $54o$ which terminates the longitudinal guidance channel $14o$ in the direction of a wiper blade $40o$. The side walls $52o$, $54o$ extend from the intermediate wall $56o$ in a direction away from the wiper blade $40o$. The holding element $12o$ has a longitudinal opening $84o$ which opens the longitudinal guidance channel $14o$ towards the spoiler unit $22o$.

Two L-shaped guide profiles $58o$, $60o$ of the holding unit $10o$ are arranged on the intermediate wall $56o$. The guide profiles $58o$, $60o$ are formed integrally with the holding element $12o$. The guide profiles $58o$, $60o$ each have a side guide $62o$, $64o$ and a vertical guide $66o$, $68o$. The vertical guides $66o$, $68o$ enclose an angle of 90° with the respective side guides $62o$, $64o$. The vertical guides $66o$, $68o$ point towards each other. The side guides $62o$, $64o$ each enclose an angle of 90° to the intermediate wall $56o$. The guide profiles $58o$, $60o$ point in directions towards each other at their free ends of the vertical guides $66o$, $68o$. The guide profiles $58o$, $60o$ and the intermediate wall $56o$ form a piping rail $70o$ in which the wiper blade $40o$ is introduced.

The holding element $12o$ is produced integrally from polyethylene in an extrusion process. A person skilled in the art in this context will consider various plastics which appear suitable such as in particular polypropylene, polyamide, polyvinyl chloride and/or polystyrene.

The spoiler unit $22o$ is produced in a co-extrusion process from two spoiler part elements $32o$, $34o$, $42o$ of different hardness. The first spoiler part element $32o$ has two spoiler sides $76o$, $78o$ which are formed concave towards the outside. The softer spoiler part element $32o$ and the harder spoiler part elements $34o$, $42o$ are joined together by material fit over a wide area. To reinforce the spoiler unit $22o$, the first spoiler part element $32o$ has a connecting web $80o$ which joins together the concave spoiler sides $76o$, $78o$. The softer spoiler part element $32o$ surrounds a longitudinal channel $82o$ which has a pentagonal cross section.

The first spoiler part element $32o$ is formed integrally with the second spoiler part elements $34o$, $42o$ and is provided to deflect travel wind. The spoiler part elements $34o$, $42o$ have a greater strength and hardness than the first spoiler part element $32o$. The spoiler part elements $34o$, $42o$ are formed separately from each other. The spoiler part element $34o$ forms the fixing means $44o$. The spoiler part element $42o$ forms the fixing means $46o$. The fixing means $44o$, $46o$ are formed circular and lie by form fit on the fixing elements $18o$, $20o$. The spring element $16o$ is let into the longitudinal guidance channel $14o$. The spring element $16o$ is made from spring steel and is provided to form the holding unit $10o$ in an elastically deflectable manner.

For assembly, first the spring element $16o$ is introduced into the longitudinal guidance channel $14o$. Then the wiper blade $40o$ is pushed into the piping rail $70o$ and creates a form fit with the holding element $12o$. The spoiler unit $22o$ is now pushed over the fixing elements $18o$, $20o$ and is then connected therewith by form fit.

Figure 16:
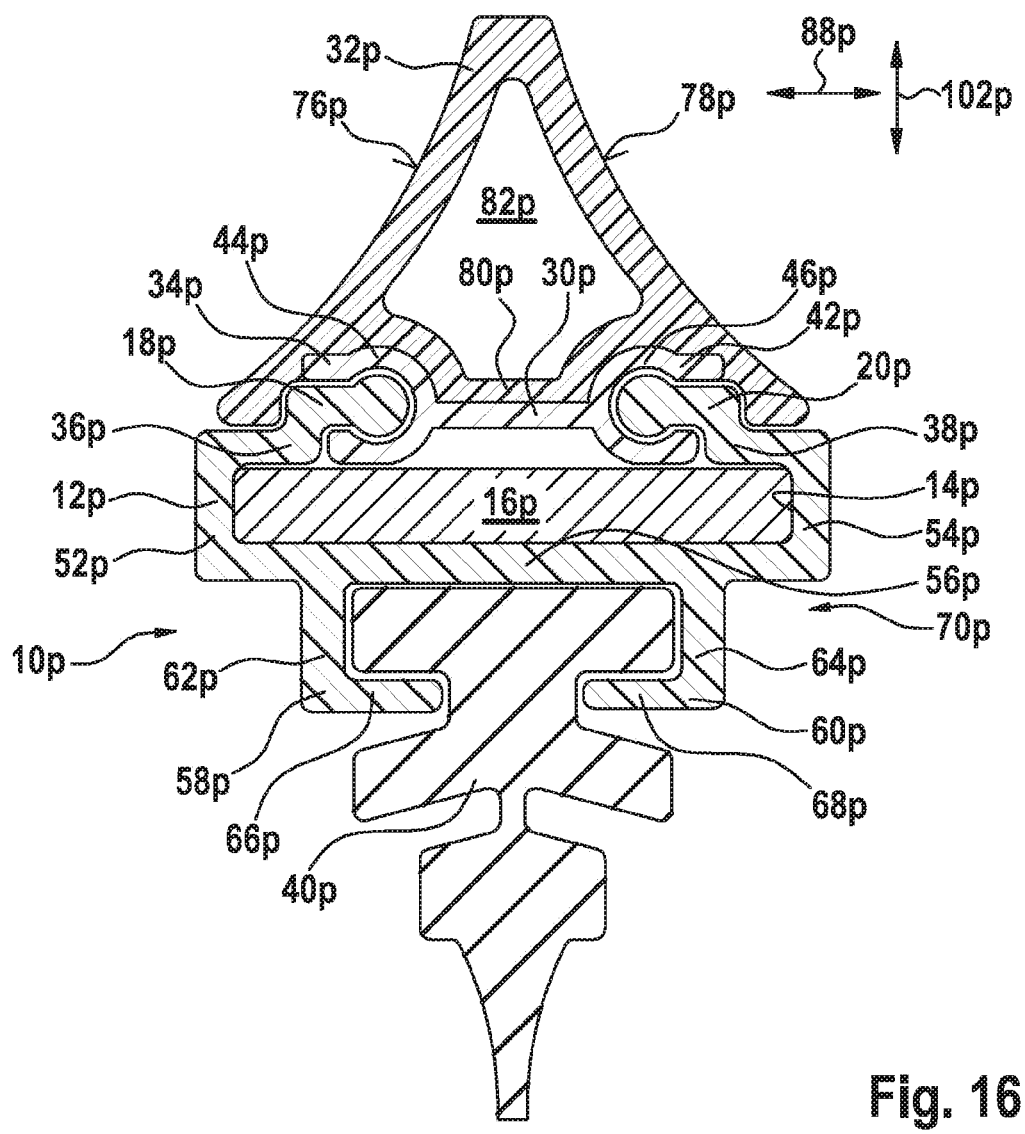
FIG. 16 a cross section view of a further exemplary embodiment of a wiping device with a holding unit.

FIG. 16 shows a cross section view of a further exemplary embodiment of a wiping device according to the invention with a holding unit 10p with a holding element 12p having a longitudinal guidance channel 14p to guide a spring element 16p. The section plane runs perpendicular to a longitudinal direction of the holding element 12p. The wiping device shown substantially corresponds to the exemplary embodiment shown in FIG. 15.

A spoiler unit 22p is formed in a co-extrusion process from two spoiler part elements 32p, 34p of different hardness. The first spoiler part element 32p has two spoiler sides 76p, 78p which are formed concave towards the outside. The softer spoiler part element 32p and the harder spoiler part element 34p are joined together by material fit over a wide area. To reinforce the spoiler unit 22p, the first spoiler part element 32p has a connecting web 80p which joins together the concave spoiler sides 76p, 78p. The softer spoiler part element 32p surrounds a longitudinal channel 82p which has a pentagonal cross section.

The spoiler unit 22p has two fixing means 44p, 46p. The fixing means 44p, 46p each form a C-shaped receiving region and hence a piping rail. The fixing means 44p, 46p are joined together via a second connecting web 30p. The fixing means 44p, 46p and the connecting web 30p are formed integrally.

What is claimed is:

1. A wiping device, with a spoiler unit (22a-22p) produced in a co-extrusion process, wherein the spoiler unit (22a-22p) has two separate harder spoiler part elements (34a-34p) separated from one another by an open gap along a wiping direction (88a) and a softer spoiler part element (32a-32p) coupled to each of the two harder spoiler part elements (34a-34p), and wherein each of the harder spoiler part elements (34a-34p) conceals a respective portion of the softer spoiler part element (32a-32p) along the wiping direction (88a-88p), so that the harder spoiler part elements (34a-34p) protect the softer spoiler part element from damage on opposite sides of the softer spoiler part element along the wiping direction (88a-88p), and further comprising a separate holding element (12a-12p) coupled to the spoiler unit (22d-22p), wherein the holding element (12a-12p) includes a longitudinal guide channel (14a) sized to receive a spring element (16a-16p) along a longitudinal direction, wherein the longitudinal guide channel (14a) is spatially offset from the open gap, such that the entire spoiler unit (22a-22p) is spaced above the longitudinal guide channel (14a) along a vertical direction (102a) that is perpendicular to both the longitudinal direction and the wiping direction (88a), wherein the holding element (12a-12p) includes side walls (52a, 54a) and channel walls (36a, 38a) that extend perpendicular to the side walls (52a, 54a), wherein the side walls (52a, 54a) and the channel walls (36a, 38a) define boundaries of the longitudinal guide channel (14a) and are configured to guide the spring element (16a-16p) in the longitudinal guide channel (14a), wherein the holding element (12a-12p) includes two L-shaped fixing elements (18a, 20a) that extend from the channel walls (36a, 38a), wherein the fixing elements include upper portions that extend along the wiping direction, wherein the upper portions include free ends (24a, 26a) that are received in the spoiler unit (22a-22p), wherein the free ends face away from one another, and wherein a distance between the free ends along the wiping direction defines a width of the holding element that is greater than a width of any other portion of the holding element along the wiping direction.

2. The wiping device as claimed in claim 1, wherein the softer spoiler part element (32a-32i; 32n) has a longitudinal channel (82a-82i; 82n) with a triangular cross section.

3. The wiping device as claimed in claim 1, further comprising a spring element (16a-16p) disposed in the longitudinal guide channel (14a-14p), wherein the entire spring element (16a-16p) is spaced below the spoiler unit (22a-22p) along the vertical direction (102a).

4. The wiping device as claimed in claim 1, wherein the spoiler unit (22d-22h; 22n) lies at least partly laterally on the holding element (12d-12h; 12n) in the region of the longitudinal guide channel (14d-14h; 14n).

5. The wiping device as claimed in claim 1, further comprising a wiper blade connected to the holding element on a side of the holding element opposite the spoiler unit.

6. The wiping device as claimed in 1, wherein the spoiler unit (22a-22p) is symmetrical about an axis (102a-102p) that extends perpendicular to the wiping direction.

7. The wiping device as claimed in claim 6, wherein interfaces between the harder spoiler part elements (34a-34p) and the softer spoiler part element (32a-32p) define planes that extend at oblique angles relative to the wiping direction.

8. The wiping device as claimed in claim 7, wherein the planes form a "V"-shape.

9. The wiping device as claimed in claim 1, wherein a plane extends along the wiping direction (88a-88p), wherein the plane passes through one of the harder spoiler part elements (34a-34p), then through the softer spoiler part element (32a-32p), and then through the other harder spoiler part element (34a-34p) moving along the wiping direction (88a-88p).

10. The wiping device as claimed in claim 9, wherein the spoiler unit (22a-22p) is symmetrical about an axis (102a-102p) that is perpendicular to the plane.

11. The wiping device as claimed in claim 1, wherein the wiping direction (88a-88p) extends through a portion of each of the harder spoiler part element (34a-34p) and the softer spoiler part element (32a-32p).

* * * * *